US012304268B2

(12) United States Patent
Galluzzi et al.

(10) Patent No.: US 12,304,268 B2
(45) Date of Patent: May 20, 2025

(54) ACTIVE SUSPENSION FOR A VEHICLE

(71) Applicants: WAY ASSAUTO SRL, Asti (IT); INSTITUTO TECNOLÓGICO Y DE ESTUDIOS SUPERIORES DE MONTERREY, Nuevo León (MX)

(72) Inventors: Renato Galluzzi, San Benigno Canavese (IT); Fabio Cotto, Turin (IT); Nicola Amati, Alpignano (IT); Manfredi Tornabene, Palermo (IT)

(73) Assignees: WAY ASSAUTO SRL, Asti At (IT); INSTITUTO TECNOLÓGICO Y DE ESTUDIOS SUPERIORES DE MONTERREY, Nuevo León (MX)

( * ) Notice: Subject to any disclaimer, the term of this patent is extended or adjusted under 35 U.S.C. 154(b) by 0 days.

(21) Appl. No.: 18/720,838

(22) PCT Filed: Dec. 1, 2022

(86) PCT No.: PCT/IB2022/061657
§ 371 (c)(1),
(2) Date: Jun. 17, 2024

(87) PCT Pub. No.: WO2023/119028
PCT Pub. Date: Jun. 29, 2023

(65) Prior Publication Data
US 2025/0050702 A1 Feb. 13, 2025

(30) Foreign Application Priority Data
Dec. 20, 2021 (IT) .......................... 102021000031739

(51) Int. Cl.
*B60G 17/08* (2006.01)
*B60G 17/015* (2006.01)
(Continued)

(52) U.S. Cl.
CPC .......... *B60G 17/08* (2013.01); *B60G 17/0152* (2013.01); *B60G 17/0165* (2013.01);
(Continued)

(58) Field of Classification Search
CPC ................ B60G 17/08; B60G 17/0152; B60G 17/0165; B60G 2202/24; B60G 2202/414;
(Continued)

(56) References Cited

U.S. PATENT DOCUMENTS 10,076,943 B2    9/2018  Masamura
11,993,125 B2 *  5/2024  Cotto .................... B60G 11/30
(Continued)

FOREIGN PATENT DOCUMENTS

CN      110553081 A    12/2019
EP       0140759 A1     5/1985
(Continued)

OTHER PUBLICATIONS

International Search Report and Written Opinion for Corresponding International Application No. PCT/IB2022/061657, Mar. 30, 2023, 10 pages.

*Primary Examiner* — Toan C To
(74) *Attorney, Agent, or Firm* — LUCAS & MERCANTI, LLP

(57) ABSTRACT

The suspension includes a hydraulic actuator and a supply hydraulic circuit connected to the hydraulic actuator to supply a compression chamber and an extension chamber of the hydraulic actuator with a working fluid. The supply hydraulic circuit includes a hydraulic pump, a high-pressure line connected to a delivery port of the hydraulic pump, a low-pressure line connected to a suction port of the hydraulic pump, and a flow control valve connected on one side to the compression chamber and extension chamber of the hydraulic actuator and on the other side to the high-pressure
(Continued)

line and low-pressure line. The flow control valve is a rotary spool valve having a spool which is rotatable continuously between a plurality of operating positions.

17 Claims, 15 Drawing Sheets

(51) Int. Cl.
*B60G 17/0165* (2006.01)
*F15B 13/04* (2006.01)
*F15B 15/18* (2006.01)

(52) U.S. Cl.
CPC .......... *F15B 13/0401* (2013.01); *F15B 15/18* (2013.01); *B60G 2202/24* (2013.01); *B60G 2202/414* (2013.01); *B60G 2202/416* (2013.01); *B60G 2204/62* (2013.01); *B60G 2204/8304* (2013.01); *B60G 2206/41* (2013.01); *B60G 2500/104* (2013.01); *B60G 2500/114* (2013.01); *B60G 2800/162* (2013.01); *B60G 2800/916* (2013.01)

(58) Field of Classification Search
CPC .......... B60G 2202/416; B60G 2204/62; B60G 2204/8304; B60G 2206/41; B60G 2500/104; B60G 2500/114; B60G 2800/162; B60G 2800/916; F15B 13/0401; F15B 15/18
See application file for complete search history.

(56) References Cited

U.S. PATENT DOCUMENTS

| 12,179,539 | B2 * | 12/2024 | Anderson | ................ F03G 7/08 |
| 2018/0022179 | A1 | 1/2018 | Collins | |
| 2018/0154728 | A1 * | 6/2018 | Giovanardi | ............ B60G 13/14 |
| 2023/0226875 | A1 * | 7/2023 | Cotto | ................. B60G 21/073 |
| | | | | 280/124.161 |

FOREIGN PATENT DOCUMENTS

| EP | 0446543 A1 | 9/1991 |
| EP | 3216632 A1 | 9/2017 |
| EP | 3378684 A1 | 9/2018 |
| WO | 2021260586 A1 | 12/2021 |

\* cited by examiner

ACTIVE SUSPENSION FOR A VEHICLE

CROSS-REFERENCE TO RELATED APPLICATIONS

This application is a 371 of PCT/IB2022/061657, filed Dec. 1, 2022, which claims the benefit of Italian Patent Application No. 102021000031739, filed Dec. 20, 2021.

Field of the Invention

The present invention relates in general to the field of vehicle suspensions, in particular motorcar suspensions. More specifically, the present invention relates to an active suspension for a vehicle, as well as to a vehicle comprising such a suspension.

Background of the Invention

It is known the use of suspensions on vehicles in order to improve the driving comfort and handling of the vehicle, filtering the irregularities of the road surface and controlling the relative movement of the sprung masses of the vehicle (including the vehicle body) with respect to the unsprung masses of the vehicle (including the wheels).

It is also known the use of so-called active suspensions on vehicles, which suspensions comprise, for each wheel, an electronically-controlled actuator arranged to control the relative movement of the wheel with respect to the vehicle body under the management of an electronic control unit. The actuator is typically a hydraulic actuator and is supplied with a working fluid under pressure provided by a pump to generate a hydraulic force, with a given intensity and a given direction (extension or compression), to counter the force generated between the wheel and the vehicle body as a result, for example, of irregularities of the road surface or during the acceleration or braking phases of the vehicle.

Active suspensions are known from EP3216632A1 and U.S. Pat. No. 10,076,943B2, which suspensions comprise a hydraulic pump, a pressure control valve for modulating the pressure in the high-pressure line downstream of the pump and a flow control valve shiftable between two operating positions to direct the working fluid under pressure to a first or a second chamber of the damper of the suspension to generate a hydraulic force in the direction of the extension movement of the damper or in the direction of the compression movement of the damper. In particular, the flow control valve may also take a safety position (fail-safe position), in which the first chamber, the second chamber, the high-pressure line and a low-pressure line are in communication with each other to make it possible for the suspension to operate in a traditional manner in case of failure of one of the controllers of the flow control valve or of the pressure control valve.

A further example of an active suspension for a vehicle is known from US 2018/022179.

According to this known solution, the suspension comprises a hydraulic actuator which is connected at a top end thereof to the vehicle body and at a bottom end thereof to the wheel and is arranged concentrically to, and in parallel with, a cylindrical helical spring. The hydraulic actuator is connected to a supply hydraulic circuit comprising a hydraulic pump, a high-pressure line connected to the delivery port of the pump, a low-pressure line connected to the suction port of the pump, a pressure accumulator connected to the high-pressure line, and a spool valve connected on one side to the compression chamber and to the extension chamber of the hydraulic actuator and on the other side to the high-pressure line and to the low-pressure line. The spool valve is shiftable, starting from a central position, in which the spool closes both the flow paths connected with the hydraulic actuator, that is to say, both the flow path connected with the compression chamber of the hydraulic actuator and the flow path connected with the extension chamber of the hydraulic actuator, in a first direction to take a first intermediate position, in which the spool opens the flow path connected with the extension chamber of the hydraulic actuator, thereby putting that chamber in hydraulic communication with the low-pressure line, while the flow path connected with the compression chamber of the hydraulic actuator remains closed, and a first end position, in which the spool also opens the flow path connected with the compression chamber of the hydraulic actuator, putting the same in hydraulic communication with the high-pressure line and thus causing, as a result of the pressure difference in the chambers of the hydraulic actuator, the extension of the rod of the hydraulic actuator, and in a second direction, opposite to the first one, to take a second intermediate position, in which the spool opens the flow path connected with the compression chamber of the hydraulic actuator, thereby putting that chamber in hydraulic communication with the low-pressure line, while the flow path connected with the extension chamber of the hydraulic actuator remains closed, and a second end position, in which the spool also opens the flow path connected with the extension chamber of the hydraulic actuator, putting the same in hydraulic communication with the high-pressure line and thus causing, as a result of the pressure difference in the chambers of the hydraulic actuator, the retraction of the rod of the hydraulic actuator. The suspension operates in active mode when the spool valve is in the first end position or in the second end position, i.e. when either of the two chambers of the hydraulic actuator is hydraulically connected with the high-pressure line. Only when the spool valve is in the first intermediate position or in the second intermediate position the suspension operates in semi-active mode, since there is no supply of energy to the hydraulic actuator, but the stiffness of the hydraulic actuator is varied as a result of the fluid flow out of either of the two chambers of the hydraulic actuator towards the low-pressure line. In the central position of the spool valve the fluid is prevented from flowing from the compression chamber or the extension chamber. In case of malfunctioning of the valve control, the suspension cannot therefore operate as a conventional suspension.

International patent application WO 2021/260586 in the Applicant's name, on which the preamble of the attached independent claim 1 is based, discloses an active suspension for a vehicle comprising, for each wheel of the vehicle, a respective hydraulic actuator having a compression chamber and an extension chamber, and a spool valve connected on one side to the compression chamber and to the extension chamber of the hydraulic actuator and on the other side to a high-pressure line and to a low-pressure line to put the chambers of the hydraulic actuator in fluid communication with the high-pressure and low-pressure lines. The spool valve includes a spool that is configured to continuously translate between a plurality of operating positions comprised, in a first direction, between a rest position and a first end position and, in a second direction opposite to the first direction, between the rest position and a second end position, the spool valve being configured in such a manner that in each operating position of the spool it connects at least one of the compression chamber and the extension chamber of the hydraulic actuator with the high-pressure line.

In addition, EP0446543 discloses a control system for a hydraulic actuator, for use for example in a vehicle suspension, comprising a rotary spool valve, an electric motor for driving the valve spool into rotation, and a transmission mechanism for transmitting motion from the drive shaft of the electric motor to a driven disc which is drivingly connected for rotation with the valve spool.

SUMMARY OF THE INVENTION

It is an object of the present invention to provide an active suspension for a vehicle of an improved type over the prior art discussed above.

This and other objects are fully achieved by virtue of an active suspension for a vehicle as defined in the attached independent claim 1.

Preferred embodiments of an active suspension for a vehicle according to the present invention are defined in the dependent claims.

In summary, the invention is based on the idea of providing an active suspension for a vehicle of the type specified above, wherein the valve that controls the flow of the working fluid between the high-pressure and low-pressure lines and the extension and compression chambers of the hydraulic actuator is a rotary spool valve configured in such a way that in each operating position it connects at least one of the two chambers of the hydraulic actuator with the high-pressure line. Furthermore, according to the invention the electric motor that drives the spool into rotation is mounted coaxially with the spool and the latter is rigidly connected, in particular formed in one piece, with the shaft of the electric motor.

By virtue of such a configuration, the active vehicle suspension of the present invention allows to quickly and precisely adjust the force generated by the hydraulic actuator by properly controlling the operating position of the flow control valve. In addition, using a rotary spool valve instead of a translating spool valve as the flow control valve makes it possible to reduce the overall sizes in the axial direction, to ensure a nearly constant actuation (in this case, an actuation torque) regardless of the position of the rotor of the electric motor driving the valve and of the position of the spool, and to ensure the linearity of the system from a mathematical point of view, due to the fact that the torque transmitted from the electric motor to the spool is linearly proportional to the current with which the electric motor is energized. In addition, due to the fact that the valve spool is rigidly connected, in particular formed in one piece, with the shaft of the electric motor, a high-stiffness motion transmission system is achieved that ensures minimal actuation delays between the electric motor and the spool. Since the spool and electric motor are both submerged in oil, hydraulic seals are not required, which makes it possible to reduce friction and increase the mechanical efficiency of the system, as well as to reduce the size of the electric motor (since lower actuation torques are required, a smaller electric motor can be used). In addition, such a configuration allows the position sensor for controlling the electric motor to be mounted at either end of the rotor.

According to an embodiment, the flow control valve is configured in such a manner as to provide for a safe position of the spool, which the spool is pushed to reach by appropriate elastic means (for example, a torsion bar) in the event of failure or fault of the valve, particularly of the valve actuation system. In this safety position, both the compression chamber and the extension chamber of the hydraulic actuator are connected with the low-pressure line only.

Additional features and advantages of the present invention will be evident from the following detailed description, given purely by way of non-limiting example.

BRIEF DESCRIPTION OF THE DRAWINGS

In the following detailed description of the invention, reference will be made to the attached drawings, in which:

FIG. 8b is a graph showing, for each of the two chambers of the hydraulic actuator of the assembly of FIGS. 2 to 4, the value of the flow cross-sectional area of the ports of the inner sleeve associated with the high-pressure line and the low-pressure line of the suspension supply hydraulic circuit, respectively, with the spool in the position of FIG. 8a;

DETAILED DESCRIPTION OF PREFERRED EMBODIMENTS

Figure 1:
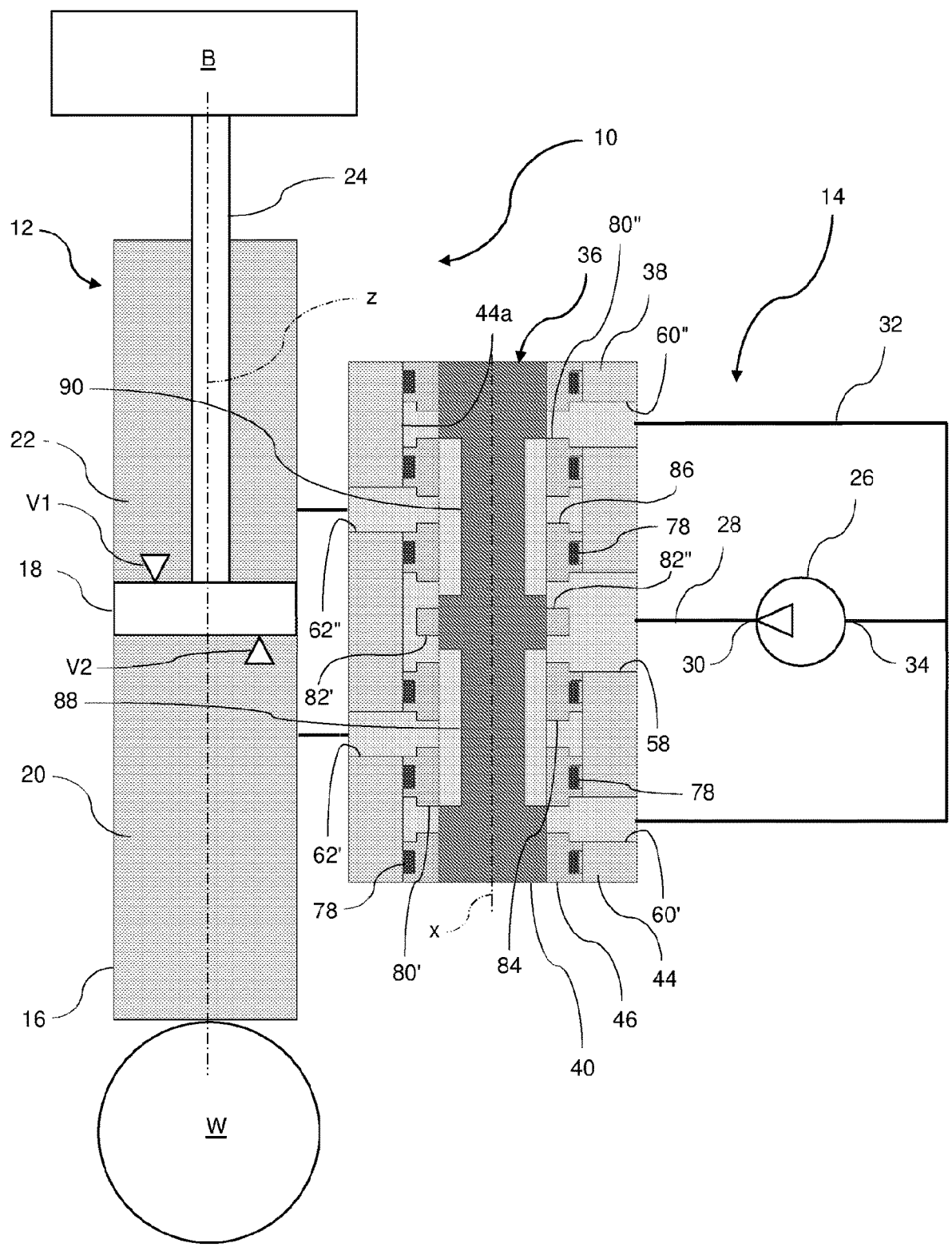
FIG. 1 is a schematic view of an active vehicle suspension according to the present invention.

Referring first to FIG. 1, an active suspension (hereinafter simply referred to as the suspension) for a vehicle according to an embodiment of the present invention is generally indicated 10.

The suspension 10 basically comprises a hydraulic linear actuator 12 (hereinafter simply referred to as the actuator), interposed between a wheel W of the vehicle and a body B of the vehicle, and a supply hydraulic circuit 14 connected to the actuator 12.

The actuator 12 includes a cylinder 16, which is connected to the wheel W and whose longitudinal axis (denoted by z) is for example oriented in a vertical direction, or in a direction slightly inclined to the vertical, and a piston 18 slidably mounted inside the cylinder 16 for sliding movement along the longitudinal axis z so as to divide the internal volume of the cylinder 16 into a pair of variable-volume chambers, namely a compression chamber 20 and an extension chamber 22, containing a working fluid (in particular oil). The actuator 12 also includes a rod 24 that is connected with a lower end thereof to the piston 18, so as to be drivingly connected for movement with the latter, and protrudes from the cylinder 16, on the side of the extension chamber 22, to be connected with an upper end thereof to the body B of the vehicle. In a manner not illustrated, but nevertheless per se known, the piston 18 is advantageously provided with pressure-limiting valves V1 and V2 (simply shown schematically in FIG. 1, as per se known), namely a compression valve and an extension valve, respectively, having the function of limiting the force exerted on the piston by the fluid pressure in the chambers 20 and 22 of the cylinder and preventing cavitation phenomena at high speeds. More specifically, the compression valve V1 acts during the compression stroke to allow the working fluid to flow from the compression chamber 20 to the extension chamber 22 when a given pressure limit value in the compression chamber 20 is exceeded, while the extension valve V2 acts during the extension stroke to allow the working fluid to flow from the extension chamber 22 to the compression chamber 20 when a given pressure limit value in the extension chamber 22 is exceeded.

The supply hydraulic circuit 14 comprises a hydraulic pump 26 (hereinafter simply referred to as the pump), a high-pressure line 28 (whose pressure will be hereinafter indicated $p_H$) connected to a delivery port 30 of the pump 26, a low-pressure line 32 (whose pressure will be hereinafter indicated $p_L$) connected to a suction port 34 of the pump 26, and a flow control valve 36 connected on one side to the compression chamber 20 and the extension chamber 22 of the actuator 12 and on the other side to the high-pressure line 28 and the low-pressure line 32 to put the two chambers 20 and 22 of the actuator 12 in fluid communication, according to predetermined modes of operation (which will be explained below), with the two lines 28 and 32 of the supply hydraulic circuit 14.

The supply hydraulic circuit 14 preferably includes a first pressure accumulator (not shown, but still of a type per se known) connected to the high-pressure line 28 and a second pressure accumulator (also not shown, but still of a type per se known) connected to the low-pressure line 32.

The pump 26 is preferably a fixed displacement pump. Depending on the specific application, there may be only one pump in the vehicle, configured to serve all the actuators on board of the vehicle (one for each wheel), or there may be several pumps, in particular either one pump for the actuators of the front axle of the vehicle and one pump for the actuators of the rear axle of the vehicle or one pump for each actuator.

The pressure $p_H$ in the high-pressure line 28 can be constant or alternatively be continuously modulated. For example, the pressure $p_H$ is between 30 and 40 bar. In contrast, the pressure $p_L$ in the low-pressure line 32 is, for example, between 5 and 10 bar.

Figure 2:
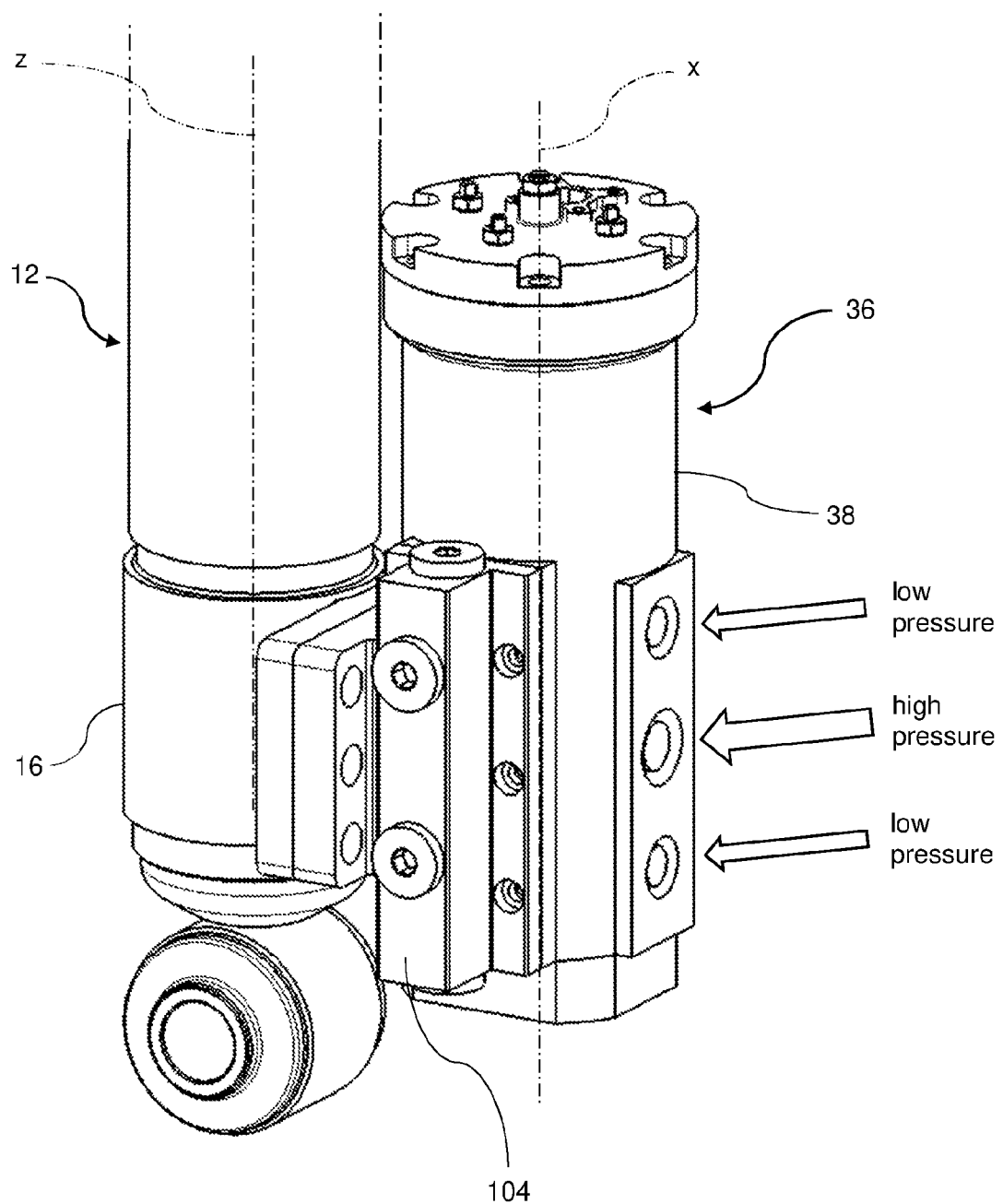
FIG. 2 is a perspective view of the hydraulic actuator and flow control valve assembly of the suspension of FIG. 1.
Figure 3:
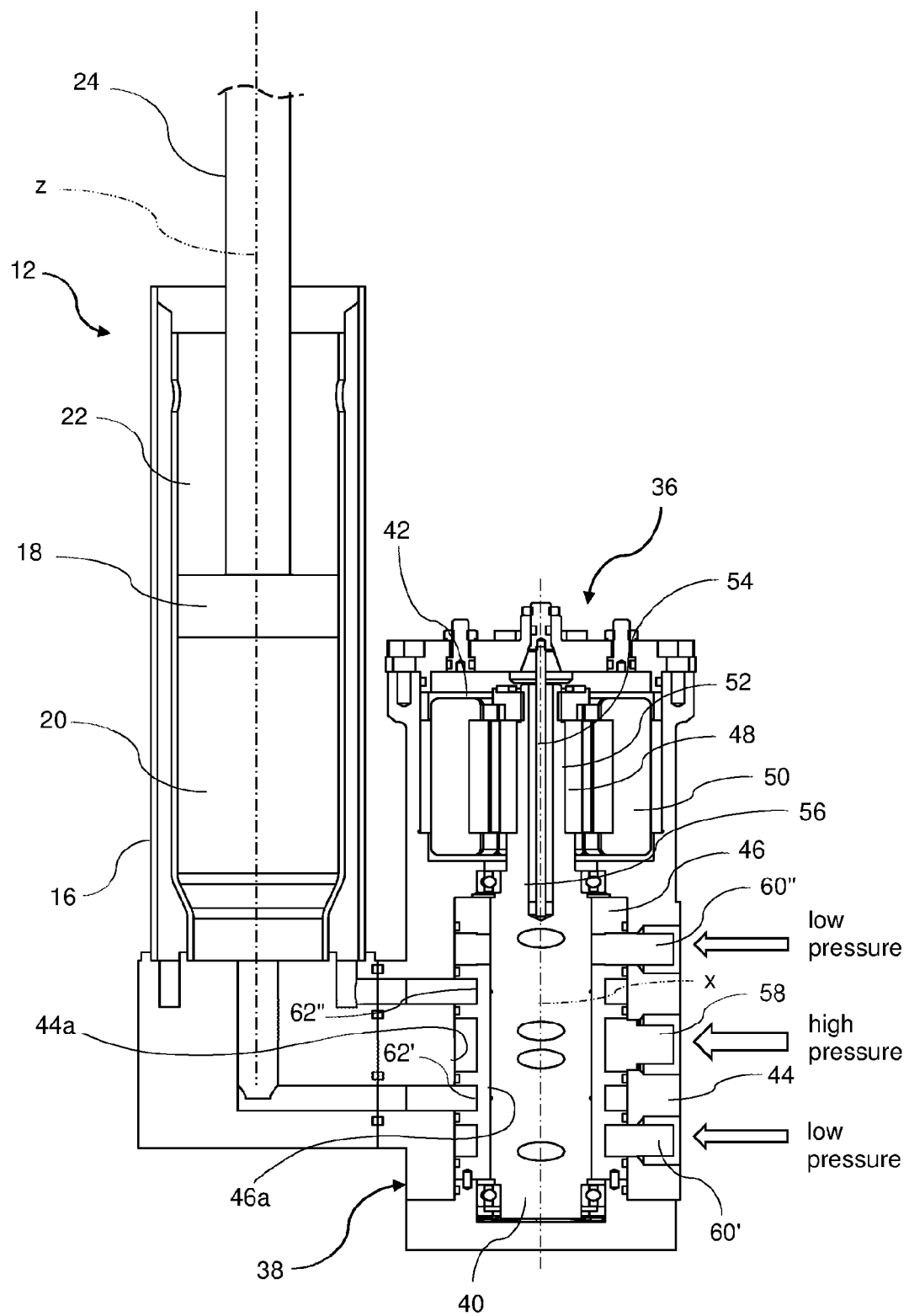
FIG. 3 is a sectional view of the hydraulic actuator and flow control valve assembly of FIG. 2.
Figure 4:
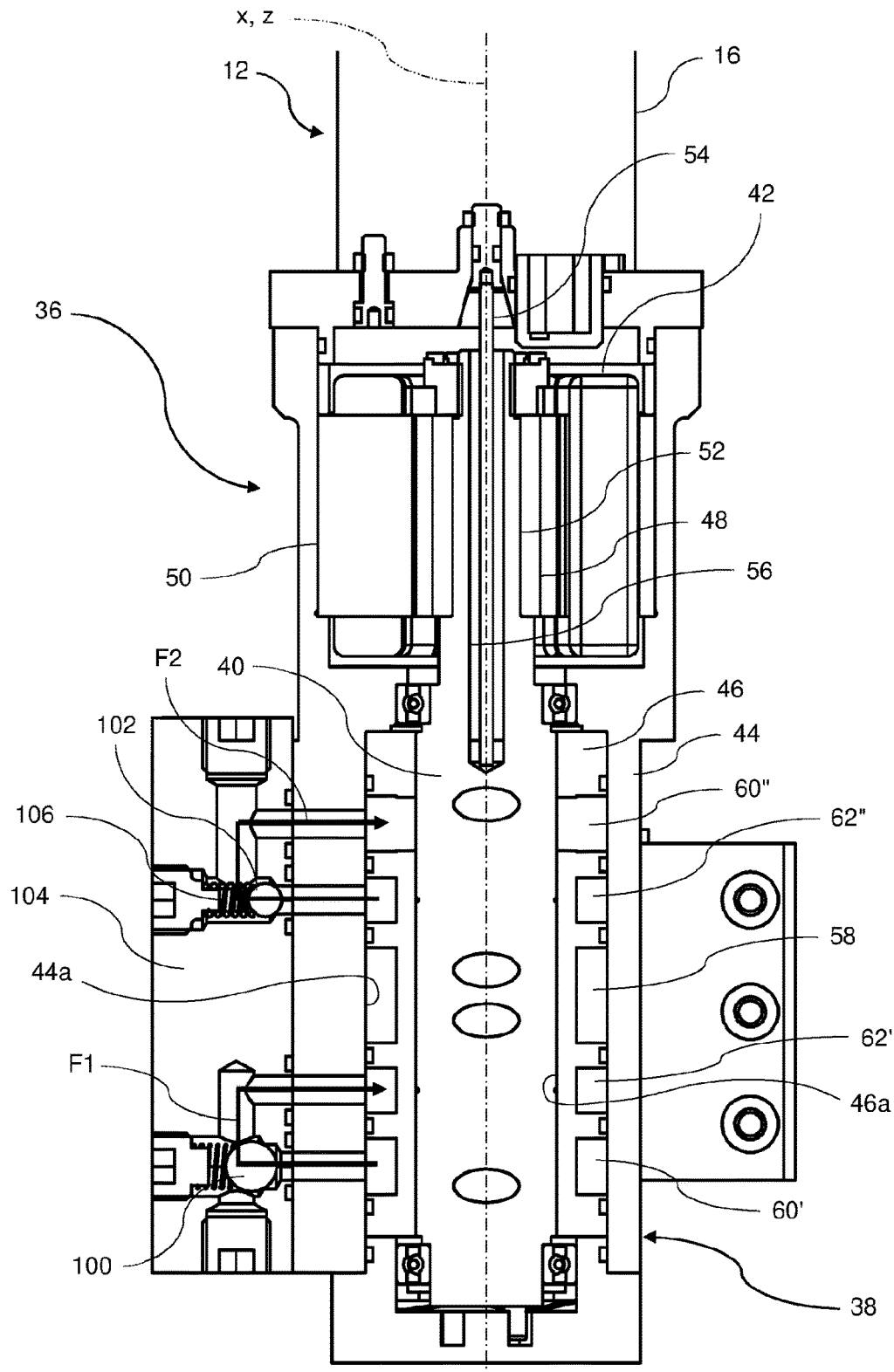
FIG. 4 is a sectional view, through a section plane perpendicular to that of FIG. 3, of the hydraulic actuator and flow control valve assembly of FIG. 2.

With reference also to FIGS. 2 to 4, the flow control valve 36 is configured as a rotary spool valve, with a valve body 38, with a spool 40 mounted in the valve body 38 in a rotating manner about an axis of rotation x, and with an actuating unit 42 arranged to drive the spool 40 into rotation in one direction or the other about the axis of rotation x. More specifically, the valve body 38 includes an outer body 44, which serves as an outer casing for the entire valve, including the actuating unit 42, and an inner sleeve 46 inserted into a cylindrical inner cavity 44a of the outer body 44. The inner sleeve 46 in turn has a cylindrical inner cavity 46a, the axis of which defines the axis of rotation x and into which the spool 40 is inserted.

The actuating unit 42 is formed by a rotary electric motor (and will be hereinafter simply referred to as "motor 42"), comprising a rotor 48 and a stator 50. The motor 42 is mounted coaxially with the spool 40 and, more in particular, the rotor 48 is mounted around a shaft 52 so as to be drivingly connected for rotation therewith, the shaft 52 being rigidly connected, in particular formed in one piece, with the spool 40. The motor 42 is properly driven by an electronic control unit (not shown) so as to position the spool 40 each time in the desired position.

Preferably, the spool 40 is connected to the valve body 38 by means of a torsion bar 54, or more generally by means of an elastic connection member, configured to exert on the spool 40 an elastic reaction torque tending to bring the spool to a given predetermined angular position, hereinafter referred to as safety position or "fail-safe" position. For example, the torsion bar 54 is inserted into a cylindrical cavity 56 provided in the shaft 52, coaxially thereto.

As shown in FIGS. 1, 3 and 4, the outer body 44 of the flow control valve 36 has one or more first inlet ports (in the present case one first inlet port 58), which are connected with the high-pressure line 28, one or more second inlet ports (in the present case two second inlet ports 60' and 60"), which are connected with the low-pressure line 32, a first outlet port 62', which is connected with the compression chamber 20 of the actuator 12, and a second outlet port 62", which is connected with the extension chamber 22 of the actuator 12.

Figure 5:
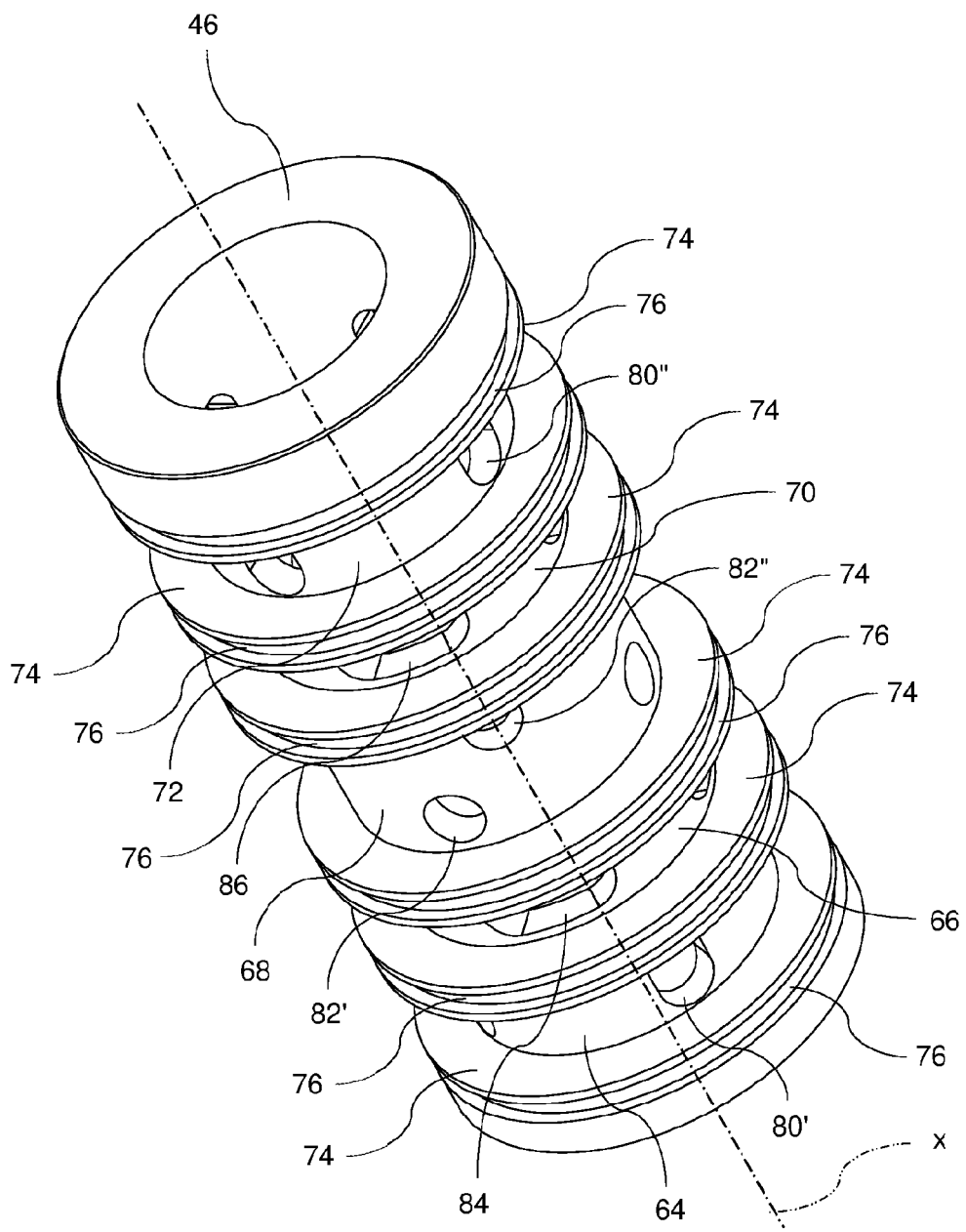
FIG. 5 is a perspective view of the inner sleeve of the flow control valve of the assembly of FIGS. 2 to 4.

With reference also to FIG. 5, the inner sleeve 46 has a plurality of cylindrical regions, respectively indicated with 64, 66, 68, 70 and 72 in the order from bottom to top according to the point of view of a person looking at FIGS. 1 to 5, in which fluid passage ports are provided that extend through the entire thickness of the inner sleeve 46, and a plurality of annular sectors 74, with a larger diameter than the cylindrical regions 64, 66, 68, 70 and 72, that fluid-tightly separate the cylindrical regions 64, 66, 68, 70 and 72 from each other. The annular sectors 74 each have a respective circumferential groove 76 into which a respective seal 78 cooperating with the cylindrical surface of the inner cavity 44a of the outer body 44 is inserted.

Still with reference in particular to FIG. 5, as well as to FIG. 1, the cylindrical regions 64 and 72, i.e. the axially outermost cylindrical regions, face the second inlet port 60' and the second inlet port 60" (hence, the inlet ports connected to the low-pressure line 32), respectively, and have a plurality of first low-pressure ports 80' and a plurality of second low-pressure ports 80", respectively, each plurality of first low-pressure ports 80' and second low-pressure ports 80" comprising in particular four ports arranged at 90 degrees to each other. Preferably, moreover, the first low-pressure ports 80' of the cylindrical region 64 are offset by 45 degrees from the second low-pressure ports 80" of the cylindrical region 72. The cylindrical region 68, i.e. the central cylindrical region, faces the first inlet port 58 (hence, the inlet port connected with the high-pressure line 28) and has a plurality of first high-pressure ports 82' and second high-pressure ports 82" arranged on two side-by-side circumferences, wherein the first high-pressure ports 82' are arranged on a first circumference, for example 90 degrees apart, and wherein the second high-pressure ports 82" are arranged on a second circumference, also for example 90 degrees apart, and are offset by a certain angle, in particular by an angle less than 45 degrees, with respect to the first high-pressure ports 82'. The cylindrical region 66, i.e. the intermediate cylindrical region arranged between the axially outermost cylindrical region 64 and the central cylindrical region 68, faces the first outlet port 62' of the outer body 44 (i.e. the outlet port connected with the compression chamber 20 of the actuator 12) and has a plurality of first ports 84, for example four ports arranged at 90 degrees to each other, made in the shape of slots elongated in a circumferential direction. Likewise, the cylindrical region 70, i.e. the intermediate cylindrical region arranged between the axially outermost cylindrical region 72 and the central cylindrical region 68, faces the second outlet port 62" of the outer body 44 (i.e. the outlet port connected with the extension chamber 22 of the actuator 12) and has a plurality of second ports 86, for example four ports arranged at 90 degrees to each other, made in the shape of slots elongated in the circumferential direction.

Figure 6:
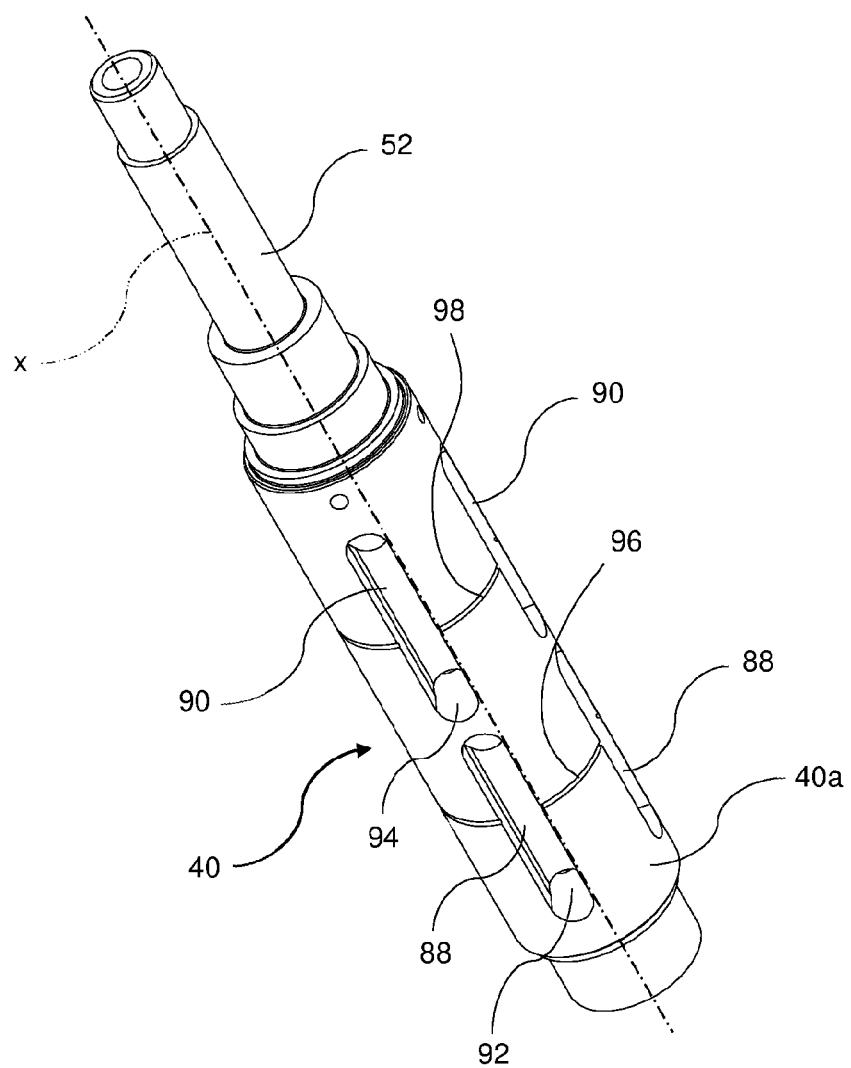
FIG. 6 is a perspective view of the spool of the flow control valve of the assembly of FIGS. 2 to 4.
Figure 7:
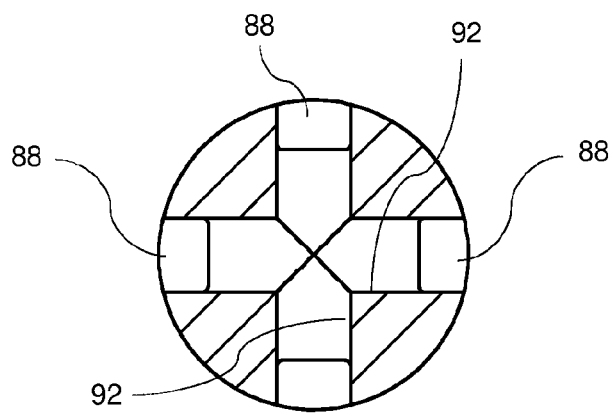
FIG. 7 is a sectional view of the spool of FIG. 6.
Figure 8A:
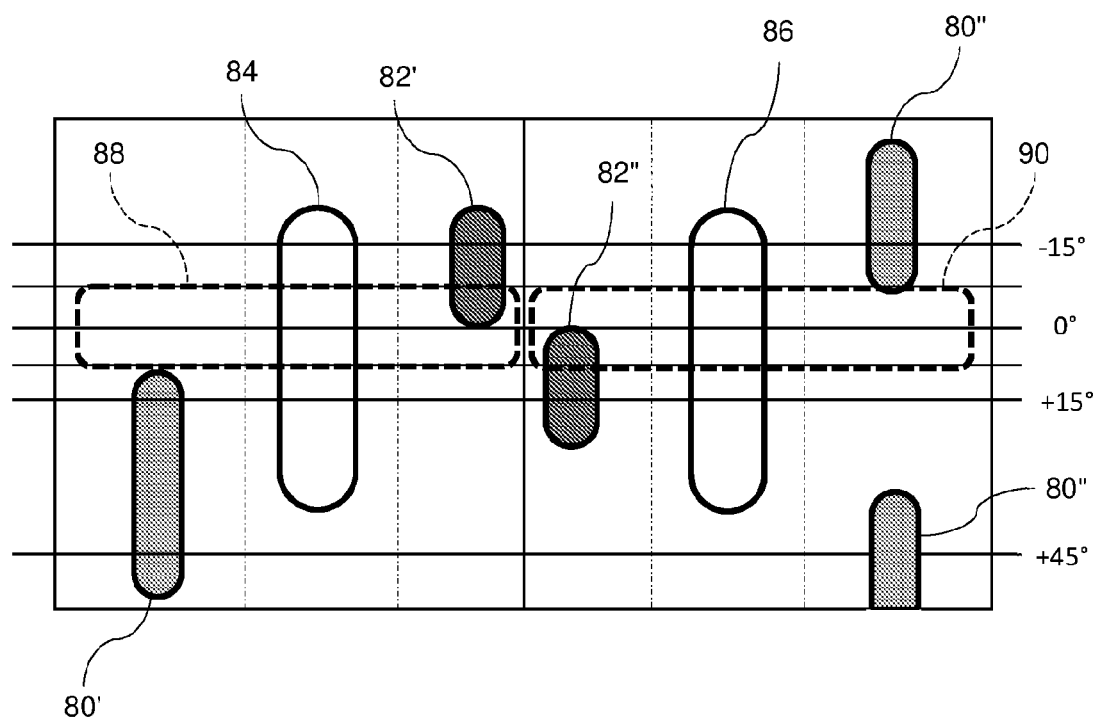
FIG. 8a schematically shows the relative arrangement of the ports of the inner sleeve spans and of the longitudinal channels of the spool of the flow control valve of the assembly of FIGS. 2 through 4, with the spool in the zero position.
Figure 8B:
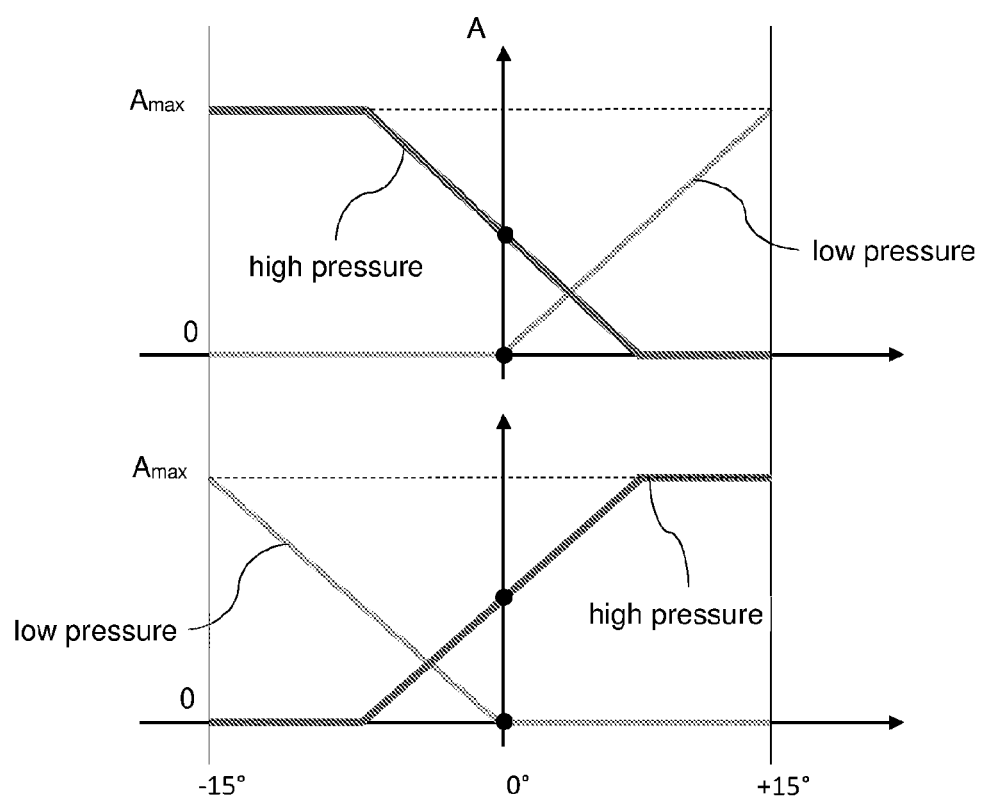

Referring now to FIGS. 6 and 7, the spool 40 has on its outer cylindrical surface (indicated 40a) a series of first longitudinal channels 88, in particular four longitudinal channels arranged at 90 degrees to each other, extending parallel to the longitudinal axis of the spool 40, i.e. to the axis of rotation x. The first longitudinal channels 88 have such a length and arrangement that they extend from the outermost cylindrical region 64 to part of the central cylindrical region 68 and, therefore, as a result of the rotation of the spool 40 about the axis of rotation x, can be selectively overlapped by the first low-pressure ports 80' of the cylindrical region 64, the first ports 84 of the cylindrical region 66 and the first high-pressure ports 82' of the cylindrical region 68. The spool 40 also has on its outer cylindrical surface 40a a series of second longitudinal channels 90, in particular four longitudinal channels arranged at 90 degrees to each other, each aligned with a respective first longitudinal channel 88. The second longitudinal channels 90 have such a length and arrangement that they extend from the outermost cylindrical region 72 to part of the central cylindrical region 68 and, therefore, as a result of the rotation of the spool 40 about the axis of rotation x, can be selectively overlapped by the second low-pressure ports 80" of the cylindrical region 72, the second ports 86 of the cylindrical region 70 and the second high-pressure ports 82" of the cylindrical region 68. The first longitudinal channels 88 are in fluid communication with each other via first radial channels 92 (shown in detail in FIG. 7), in particular four channels that extend at a right angle to each other. Likewise, the second longitudinal channels 90 are in fluid communication with each other via second radial channels 94 (only partially shown in FIG. 6), in particular four channels extending at a right angle to each other.

By virtue of the fact that the first low-pressure ports 80', the second low-pressure ports 80", the first high-pressure ports 82' and the second high-pressure ports 82" of the sleeve 46 are arranged angularly equally spaced in the circumferential direction, in particular—as explained above—at 90 degrees to each other, and that, likewise, the first longitudinal channels 88 and the second longitudinal channels 90 of the sleeve 40 are also arranged angularly equally spaced in the circumferential direction, in particular—as explained above—at 90 degrees to each other, a balancing of the pressures acting in the channels of the sleeve is obtained and thus the resultant force acting on the sleeve is cancelled, or at least minimized, thereby leasing to an improved operation of the valve.

The various positions that the spool 40 can take as a result of its rotation about the axis of rotation x, and thus the operation of the suspension, will be now illustrated with reference to FIGS. 8-15.

Figure 14A:
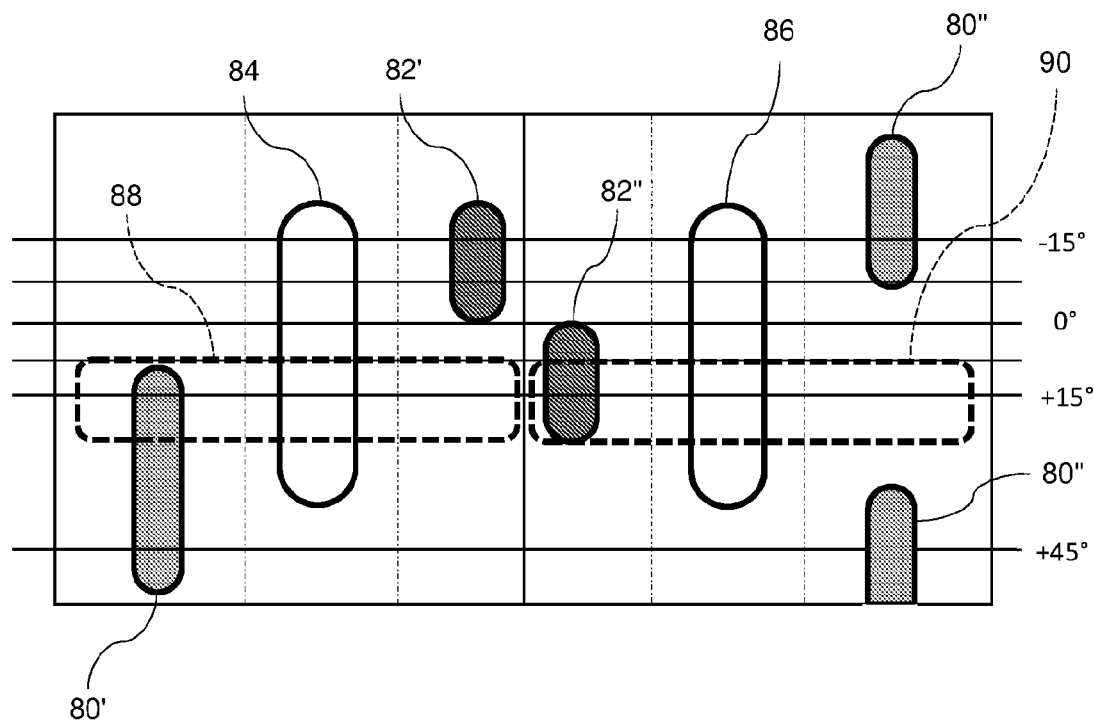
Figure 14B:
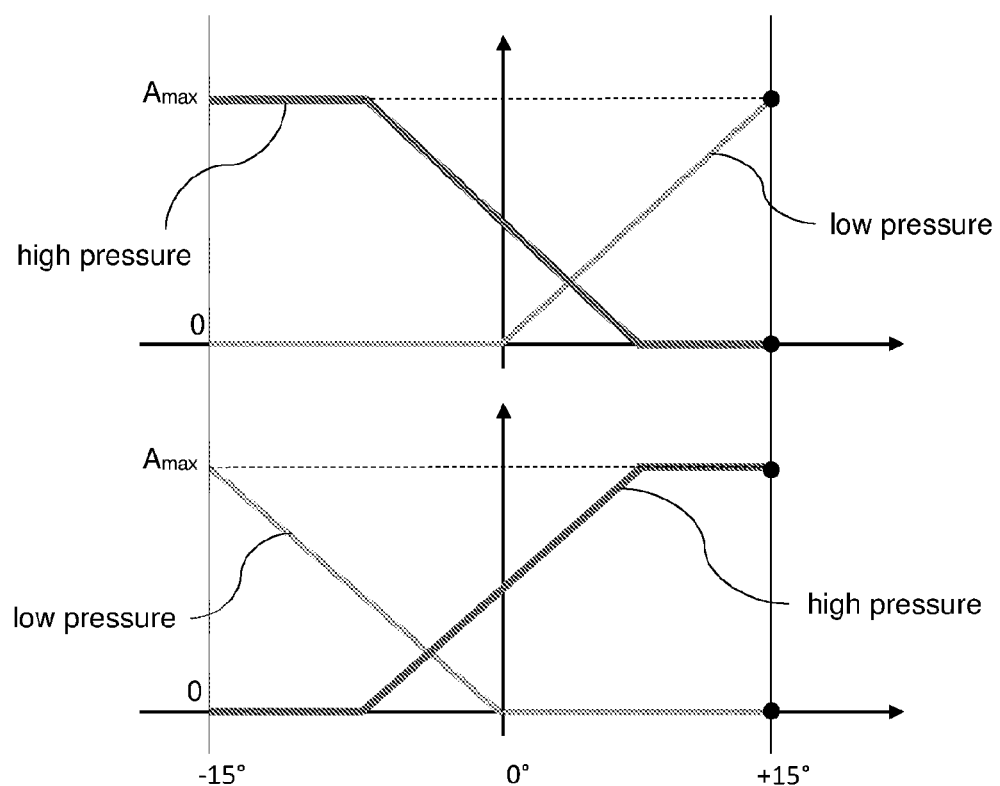

Starting from a zero position (FIGS. 8a and 8b), the spool 40 can be rotated in a first direction until it reaches a first end operating position (FIGS. 11a and 11b) and in a second direction opposite to the first one until it reaches a second end operating position (FIGS. 14a and 14b). In the illustrated example, the angular travel between the zero position and the first end operating position, as well as between the zero position and the second end operating position, is equal to 15 degrees, but of course it might also be greater or less than 15 degrees depending on the specific application.

The spool 40 is continuously movable between these positions and can thus take any intermediate position between the zero position and the first end operating position, as well as between the zero position and the second end operating position. It is thus possible to continuously adjust the fluid pressure in the chambers 20 and 22 of the actuator 12.

As can be seen from these Figures, at any position of the spool 40 between the first end operating position and the second end operating position the first longitudinal channels 88 of the spool 40 are superimposed on the first ports 84 of the inner sleeve 46, and thus in fluid communication, via the first outlet port 62', with the compression chamber 20 of the actuator 12, and, likewise, the second longitudinal channels 90 of the spool 40 are superimposed on the second ports 86 of the inner sleeve 46, and thus in fluid communication, via the second outlet port 62', with the extension chamber 22 of the actuator 12.

With the spool 40 in the zero position (FIGS. 8a and 8b), the first longitudinal channels 88 of the spool 40 are partially overlapped by the first high-pressure ports 82', for example to such an extent that the flow cross-sectional area of the working fluid through the first high-pressure ports 82' is approximately equal to half the maximum flow cross-sectional area $A_{max}$, while they are not overlapped by the first low-pressure ports 80'. In addition, the second longitudinal channels 90 of the spool 40 are partially overlapped by the second high-pressure ports 82', in particular so as to define a flow cross-sectional area equal to that defined through the first high-pressure ports 82', while they are not overlapped with the second low-pressure ports 80'. It follows that both the compressor chamber 20 and the extension chamber 22 of the actuator 12 are supplied only with high-pressure fluid and thus are both at the same pressure $p_H$ (high pressure). An upward force is thus exerted on the piston 18 of the actuator 12 because of the difference between the areas over which the fluid pressure acts in the chambers 20 and 22. In addition, in this position the compression chamber 20 and the extension chamber 22 of the actuator 12 communicate with each other via the outlet ports 62' and 62", the longitudinal channels 88 and 90 and the high-pressure ports 82' and 82".

Figure 9A:
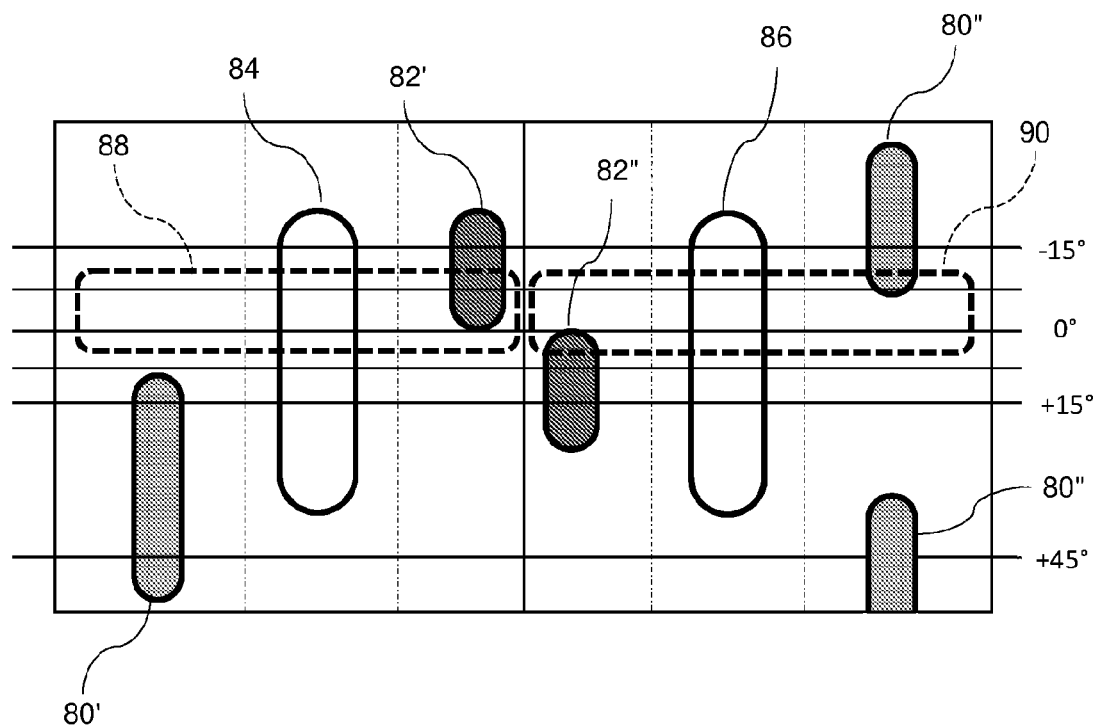
FIGS. 9a-9b to 11a-11b are views similar to those of FIGS. 8a-8b, with the spool moving between the zero position and the first end operating position.
Figure 9B:
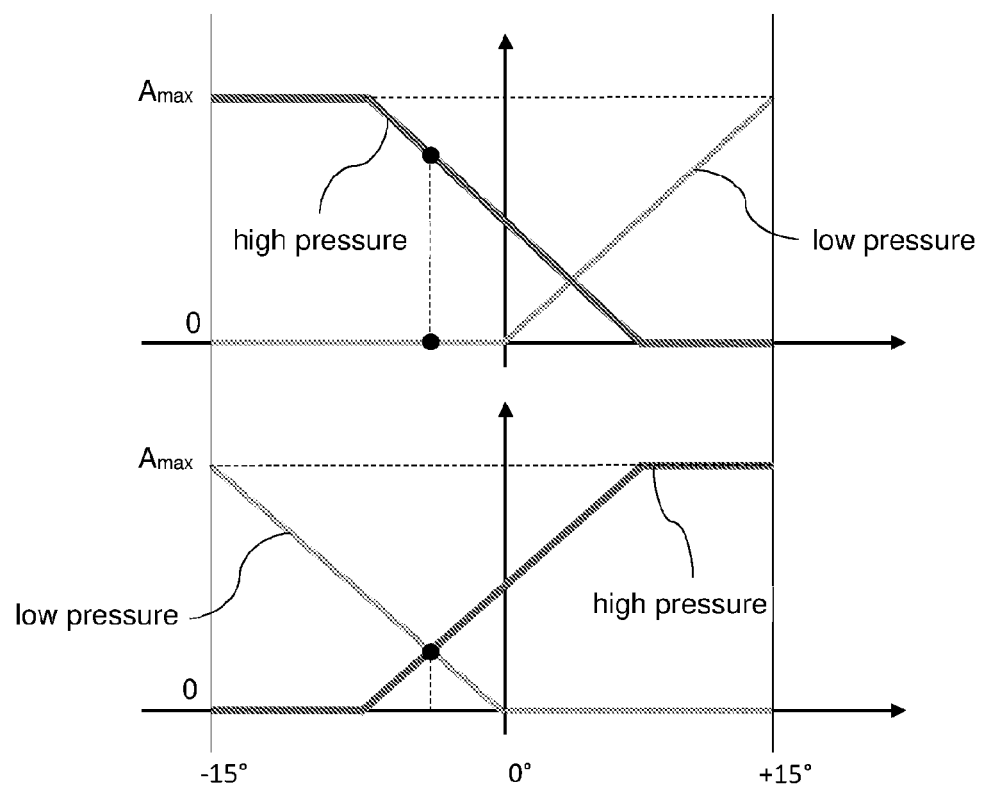
Figure 10A:
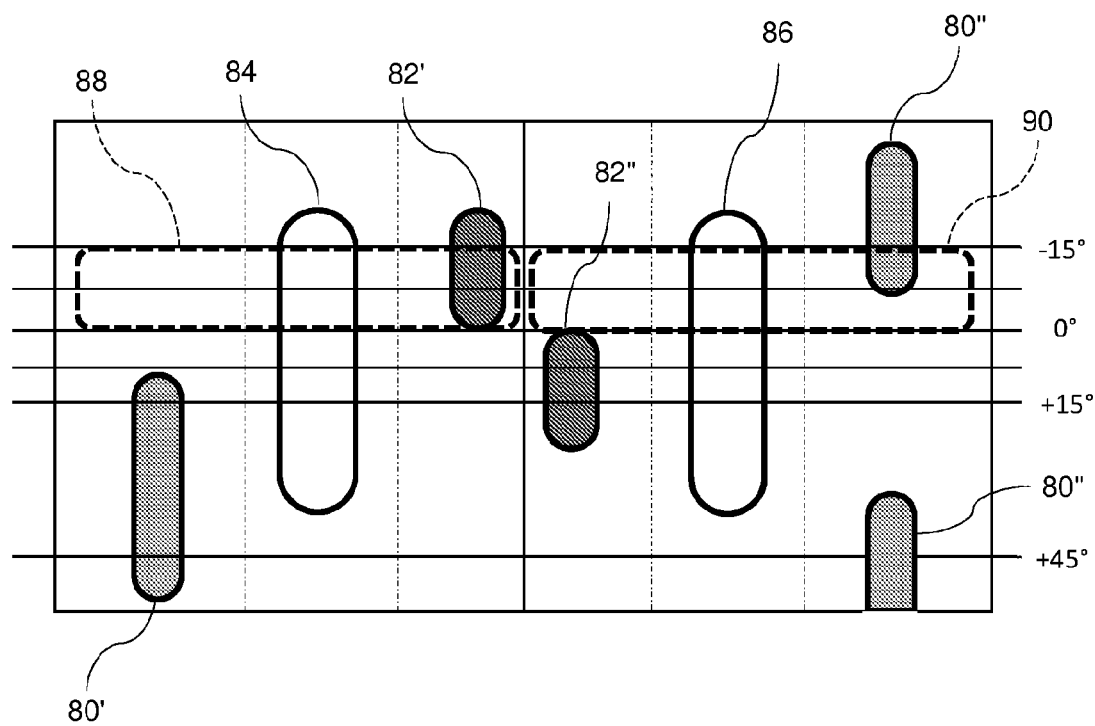
Figure 10B:
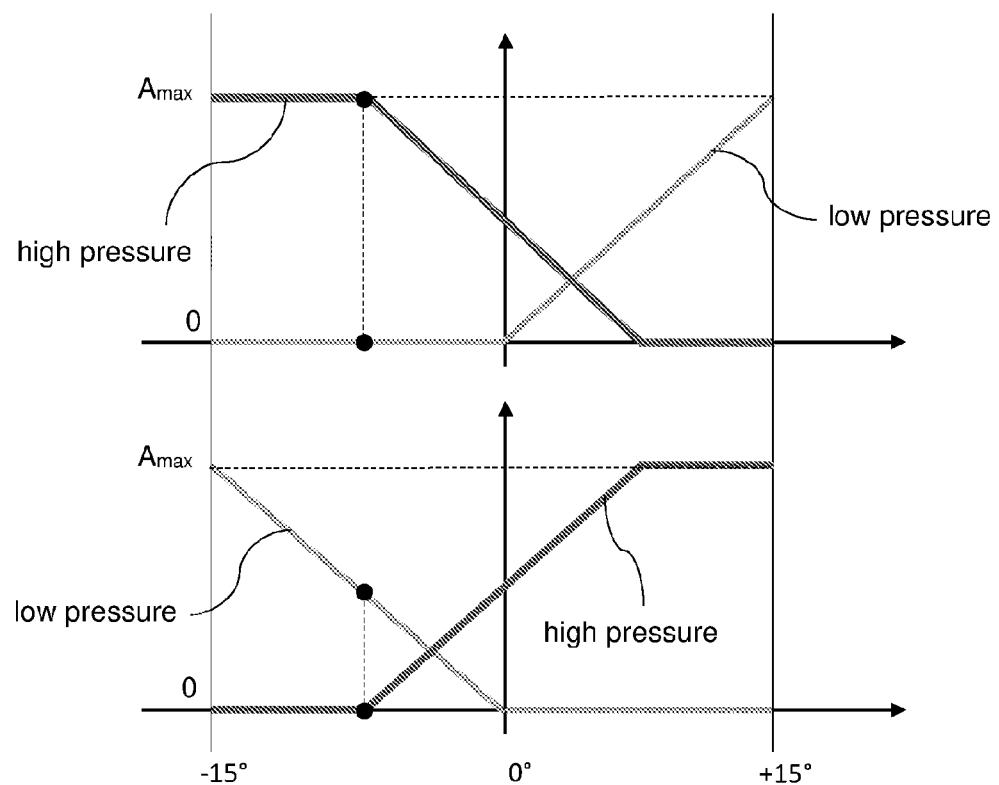
Figure 11A:
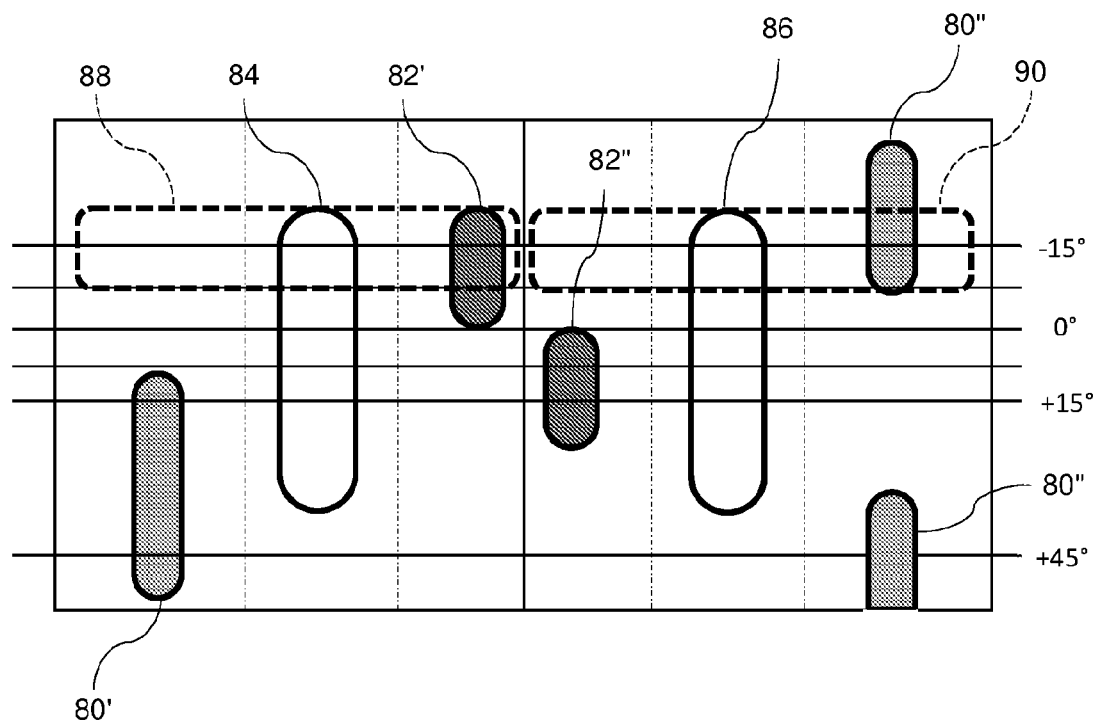
Figure 11B:
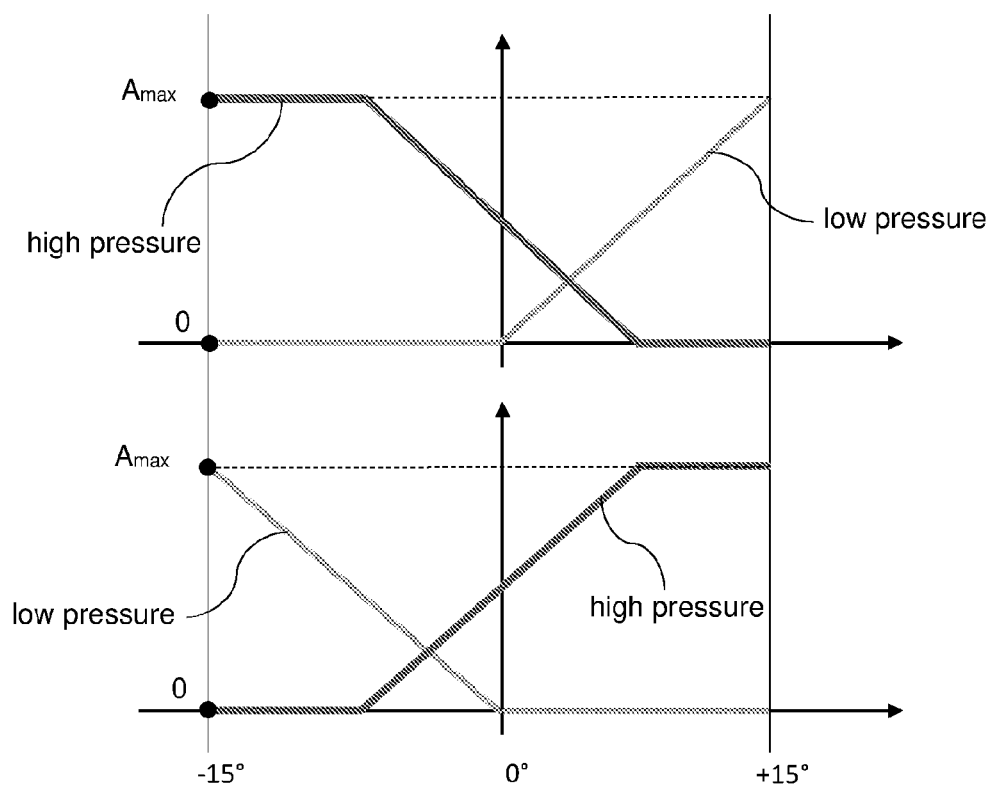

If, starting from the zero position shown above, the spool 40 is moved towards the first end operating position (so that the first longitudinal channels 88 and the second longitudinal channels 90 of the spool 40 are moved upwards, in the schematic views of FIGS. 9a, 10a and 11a, relative to the ports provided in the inner sleeve 46), the degree of overlap between the first longitudinal channels 88 and the first high-pressure ports 82' increases gradually, in particular linearly, reaching its maximum value (corresponding to the maximum flow cross-sectional area $A_{max}$) at, for example, the midpoint of the angular travel between the zero position and the first end operating position (FIG. 10a) and then maintaining this maximum value up to the first end operating position (FIG. 11a). Therefore, the compression chamber 20 of the actuator 12 continues to be supplied with high-pressure fluid and is thus maintained at pressure $p_H$. Regarding the second longitudinal channels 90 of the spool 40, with the displacement from the zero position to the first end operating position the degree of overlap with the second high-pressure ports 82" decreases, in particular linearly, until it becomes zero, for example at the midpoint of the angular travel between the zero position and the first end operating position (FIG. 10a), and then remains zero up to the first end operating position (FIG. 11a), while the degree of overlap with the second low-pressure ports 80" increases, in particular linearly, until it takes its maximum value (maximum flow cross-sectional area $A_{max}$) at the first end operating position (FIG. 11a). As a result, in the extension chamber 22 of the actuator 12 the pressure decreases from the value $p_H$ at the zero position (FIG. 8b) to the value $p_L$ (low pressure) at the midpoint of the angular travel between the zero position and the first end operating position (FIG. 10b), and then remains constant on the value $p_L$ up to the first end operating position (FIG. 11b).

The upward force exerted on the piston 18 of the actuator 12 thus increases between the zero position and the first end operating position, until it reaches its maximum value at the intermediate position of FIGS. 10a and 10b, and then maintains that maximum value up to the first end operating position.

Figure 12A:
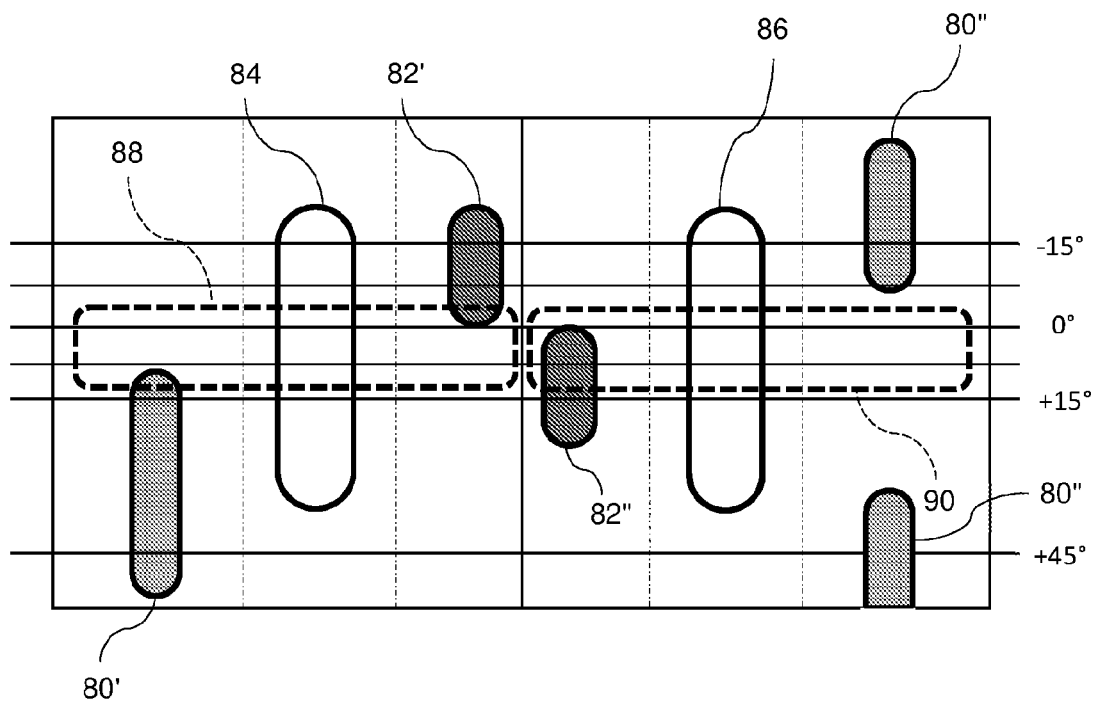
FIGS. 12a-12b to 14a-14b are views similar to those of FIGS. 8a-8b, with the spool moving between the zero position and the second end operating position.
Figure 12B:
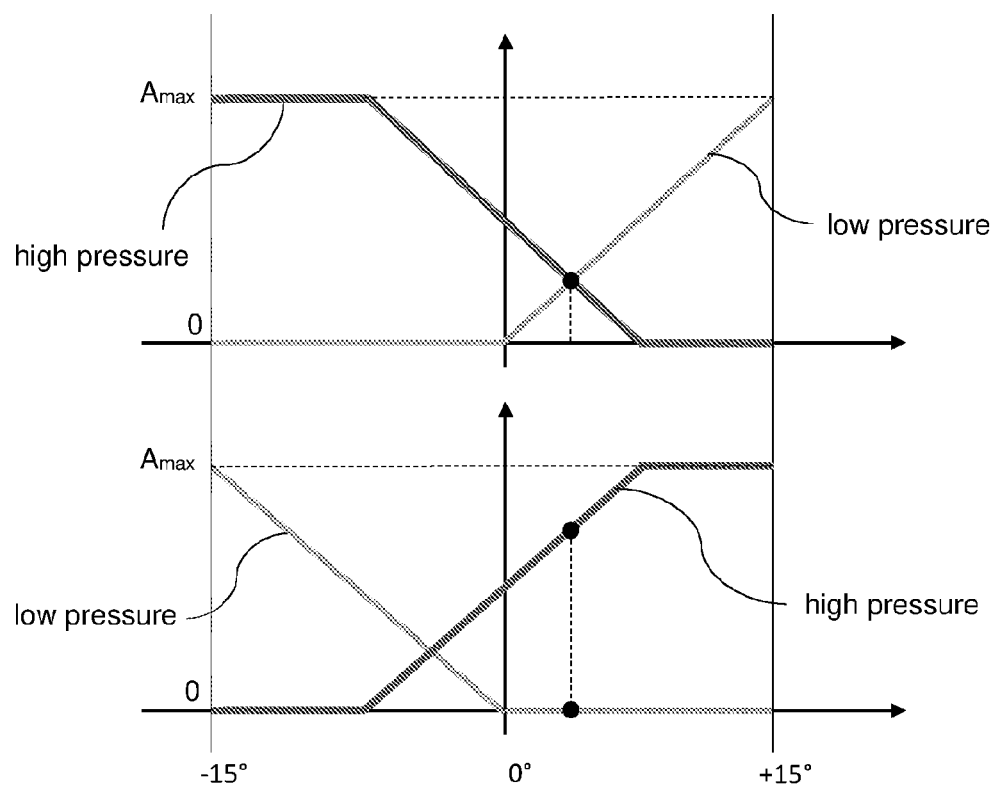
Figure 13A:
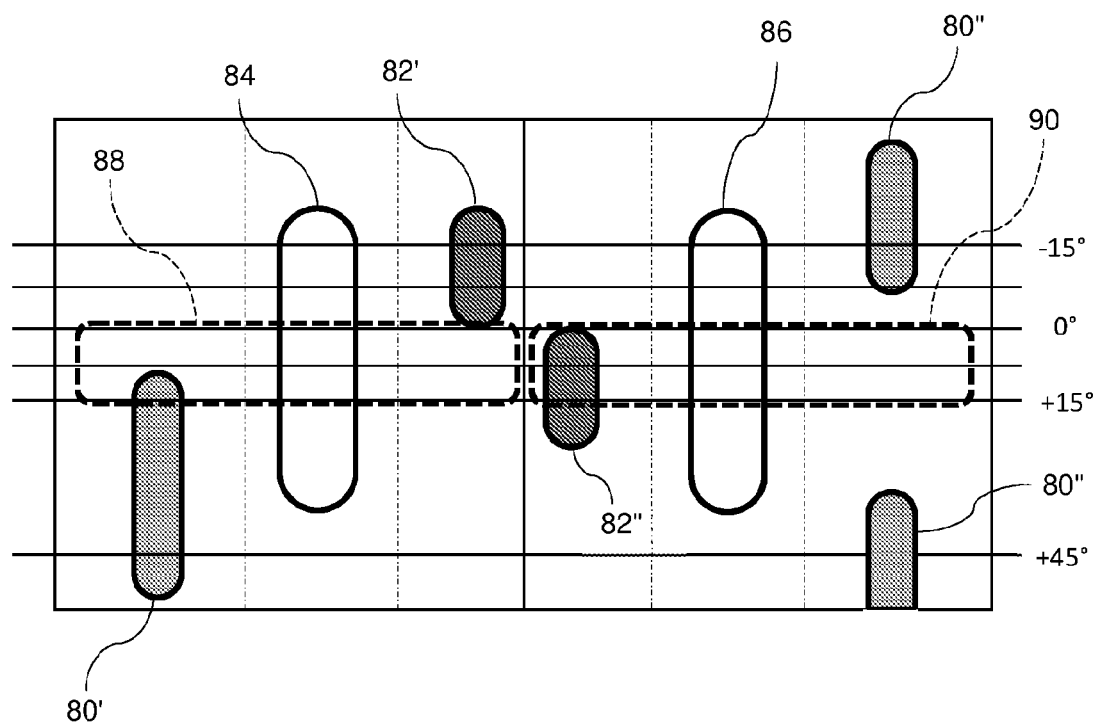
Figure 13B:
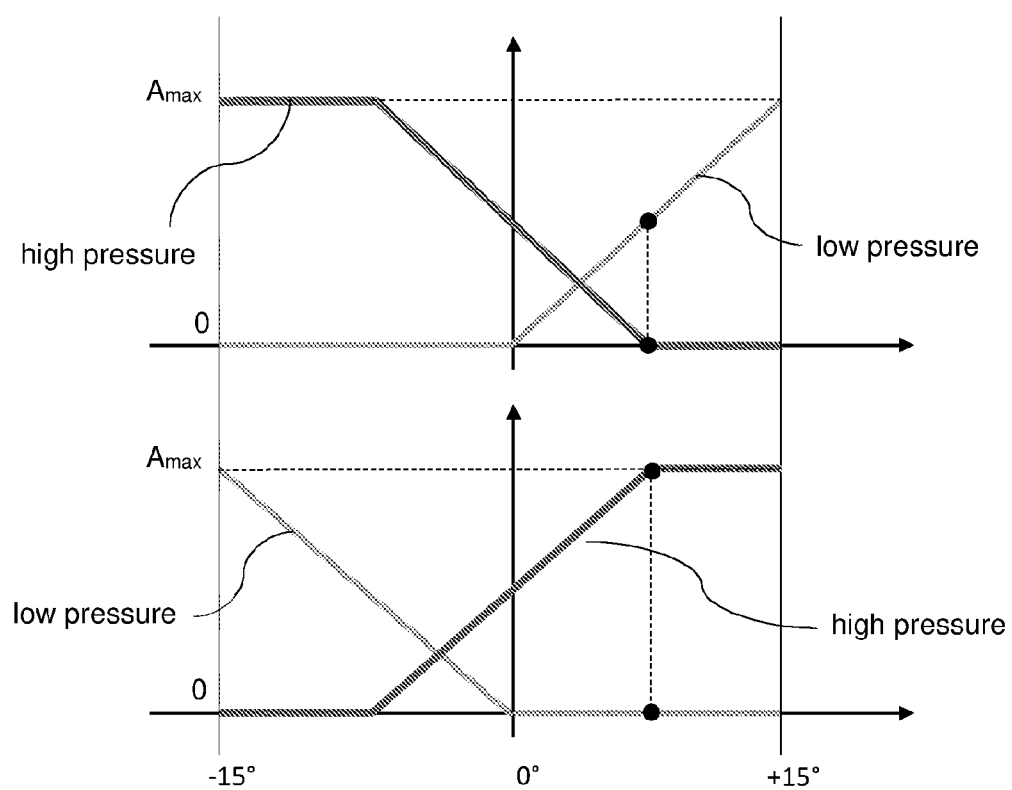

As can be observed in FIGS. 12a-12b to 14a-14b, when the spool 40 is moved from the zero position to the second end operating position (whereby the first longitudinal channels 88 and the second longitudinal channels 90 of the spool 40 move downwards, in the schematic views of FIGS. 12a, 13a and 14a, relative to the ports provided in the inner sleeve 46) the variation in the flow cross-sectional areas of the ports of the inner sleeve 46 associated with the high-pressure line 28 and the low-pressure line 32 is symmetrical to that described above with reference to the movement of the spool from the zero position to the first end operating position. Therefore, the course of the flow cross-sectional areas during this movement will not be described in detail, but reference is made to the observation of these Figures.

The pressure in the compression chamber 20 of the actuator 12 decreases from the value $p_H$ to the value $p_L$ between the zero position and the second final operating position, while in the extension chamber 22 it always remains at the value $p_L$. It follows that after an initial condition in which the resultant force on the piston 18 of the actuator 12 is directed upwards, an end condition is reached in which the resultant force is directed downwards. Specifically, the resultant force is directed downwards and is maintained at its maximum value in the angular range between the intermediate position of FIGS. 13a and 13b and the second final operating position of FIGS. 14a and 14b.

Figure 15:
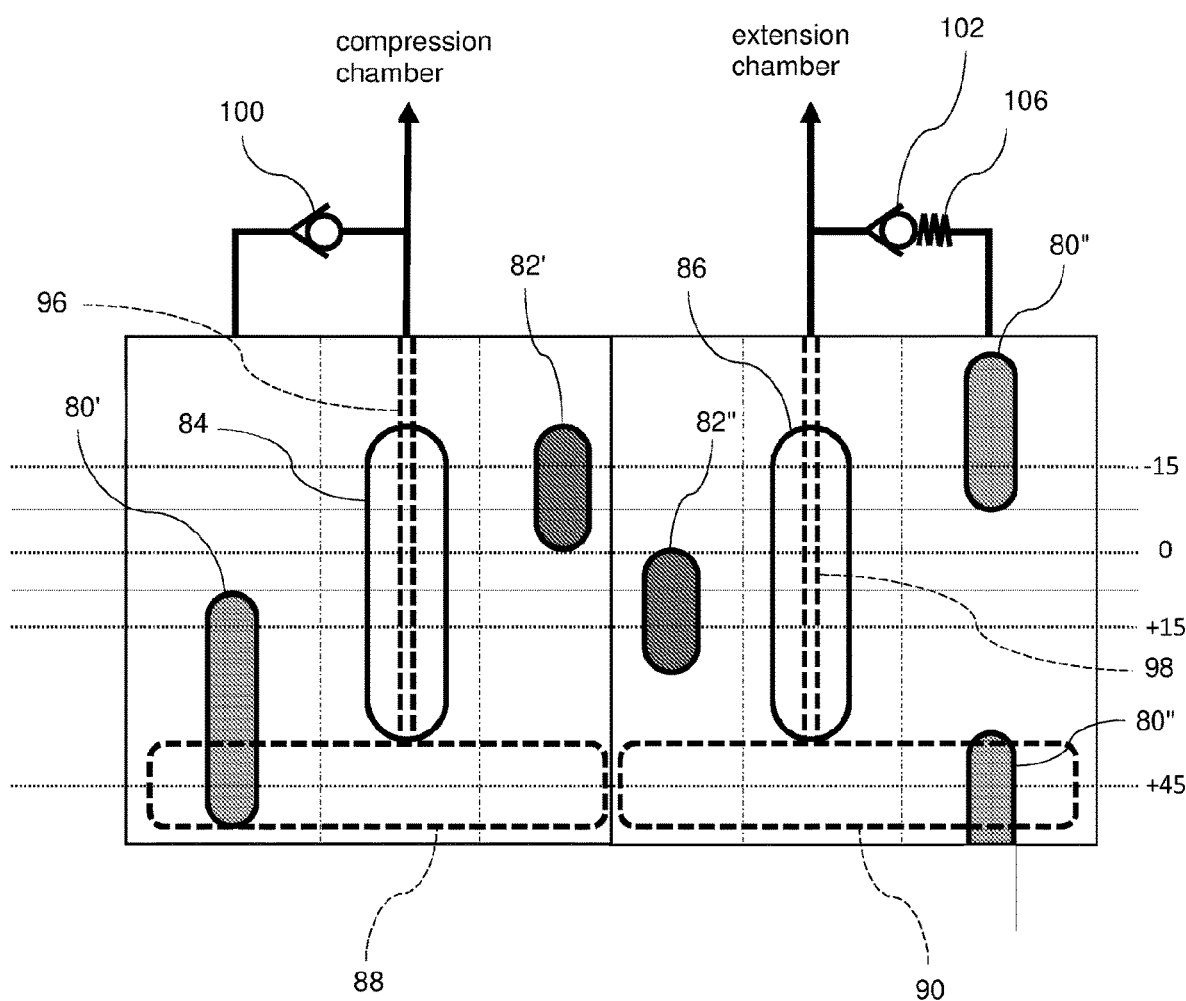
FIG. 15 schematically shows the relative arrangement of the ports of the sleeve and of the longitudinal channels of the spool of the flow control valve of the assembly of FIGS. 2 to 4, with the spool in a safety position in case of failure or fault ("fail-safe" position)

Finally, FIG. 15 shows the spool 40 in a safety position (or "fail-safe" position) in the event of a failure or fault of the valve, in particular of the valve actuation system. This position is reached thanks to the elastic connection member (in this case, the torsion bar 54) that connects the spool 40 to the valve body 38. In other words, the safety position of the spool 40 corresponds to the rest position of the elastic connection member, i.e. the position at which the elastic reaction torque exerted by the elastic connection member (in the present case, the elastic reaction torque exerted by the torsion bar 54) on the spool 40 is zero. In the illustrated example, the angular travel between the zero position and the safety position is 45 degrees, but of course it might also be greater or less than 45 degrees (as long as it is greater than the travel, in the present case 15 degrees, between the zero position and the first or second end operating position) depending on the specific application. Moreover, in the present case the safety position is rotated, relative to the zero position, in the same direction as the second end operating position, but might alternatively be rotated in the same direction as the first end operating position.

In the safety position, the first longitudinal channels 88 of the spool 40 are not overlapped by the first ports 84 of the inner sleeve 46, but are nevertheless in fluid communication with those ports, and thus with the first outlet port 62', via first safety grooves 96 that extend along the circumference of the spool 40 and connect the first longitudinal channels 88 to each other (FIG. 6). Likewise, the second longitudinal channels 90 of the spool 40 are not overlapped by the second ports 86 of the inner sleeve 46, but are nevertheless in fluid communication with those ports, and thus with the second outlet port 62', via second safety grooves 98 that extend along the circumference of the spool 40 and connect the second longitudinal channels 90 to each other (FIG. 6).

Therefore, in the safety position, both the compression chamber 20 and the extension chamber 22 of the actuator 12 are in fluid communication with the low-pressure line 32 through the aforementioned first safety grooves 96 and the aforementioned second safety grooves 98, respectively. The first safety grooves 96, as well as the second safety grooves 98, have a reduced flow cross-sectional area with respect both to the first and second longitudinal channels 88, 90 of the spool 40 and the first and second ports 84, 86 of the inner sleeve 46, which allows the movement of the rod 24 of the hydraulic actuator 12 to be "restrained" during both the extension stroke and the compression stroke.

A pair of check valves 100 and 102, hereinafter referred to as the first check valve and the second check valve, respectively, which are mounted in a valve block 104 attached to the valve body 38 of the flow control valve 36 (FIGS. 2 and 4), are also arranged to intervene in this condition. The first check valve 100 is arranged in the flow path, indicated by arrow F1 in FIG. 4, between the second inlet port 60' (connected to the low-pressure line 32) and the first outlet port 62' (connected to the compression chamber 20 of the hydraulic actuator 12) and is configured to allow the working fluid to flow in the direction from the second inlet port 60' to the first outlet port 62' only. The second check valve 102 is arranged in the flow path, indicated by arrow F2 in FIG. 4, between the second inlet port 60" (also connected to the low-pressure line 32) and the second outlet port 62" (connected to the extension chamber 22 of the hydraulic actuator 12) and is configured to allow the working fluid to flow in the direction from the second outlet port 62" to the second inlet port 60" only. If the rod 24 of the hydraulic actuator 12 is pushed downwards (compression movement), the working fluid cannot flow freely from the compression chamber 20 to the low-pressure line 32, as this flow is prevented by the first check valve 100. However, at this stage the working fluid is able to flow through both the first safety grooves 96 and the second safety grooves 98. The maximum pressure in the compression chamber 20 is then limited in series by the pressure limiting valve V1 on the piston 18 of the hydraulic actuator 12, which adjusts the pressure in the compression chamber 20 relative to the extension chamber 22, and by the second check valve 102, which adjusts the pressure in the extension chamber 22 relative to the low-pressure line 32. If, on the other hand, the rod 24 of the hydraulic actuator 12 is pushed upwards (extension movement), the working fluid can flow from the extension chamber 22 to the low-pressure line 32 through both the second safety grooves 98 and the second check valve 102. The opening pressure of the latter valve can be changed by using springs 106 of different stiffness and preload, so as to change the damping characteristic of the hydraulic actuator 12 in the safety condition. At this stage, the working fluid is allowed to flow freely from the low-pressure line 32 to the compression chamber 20 of the hydraulic actuator 12 through the first check valve 100 so as to avoid cavitation phenomena in this chamber.

Figure 16:
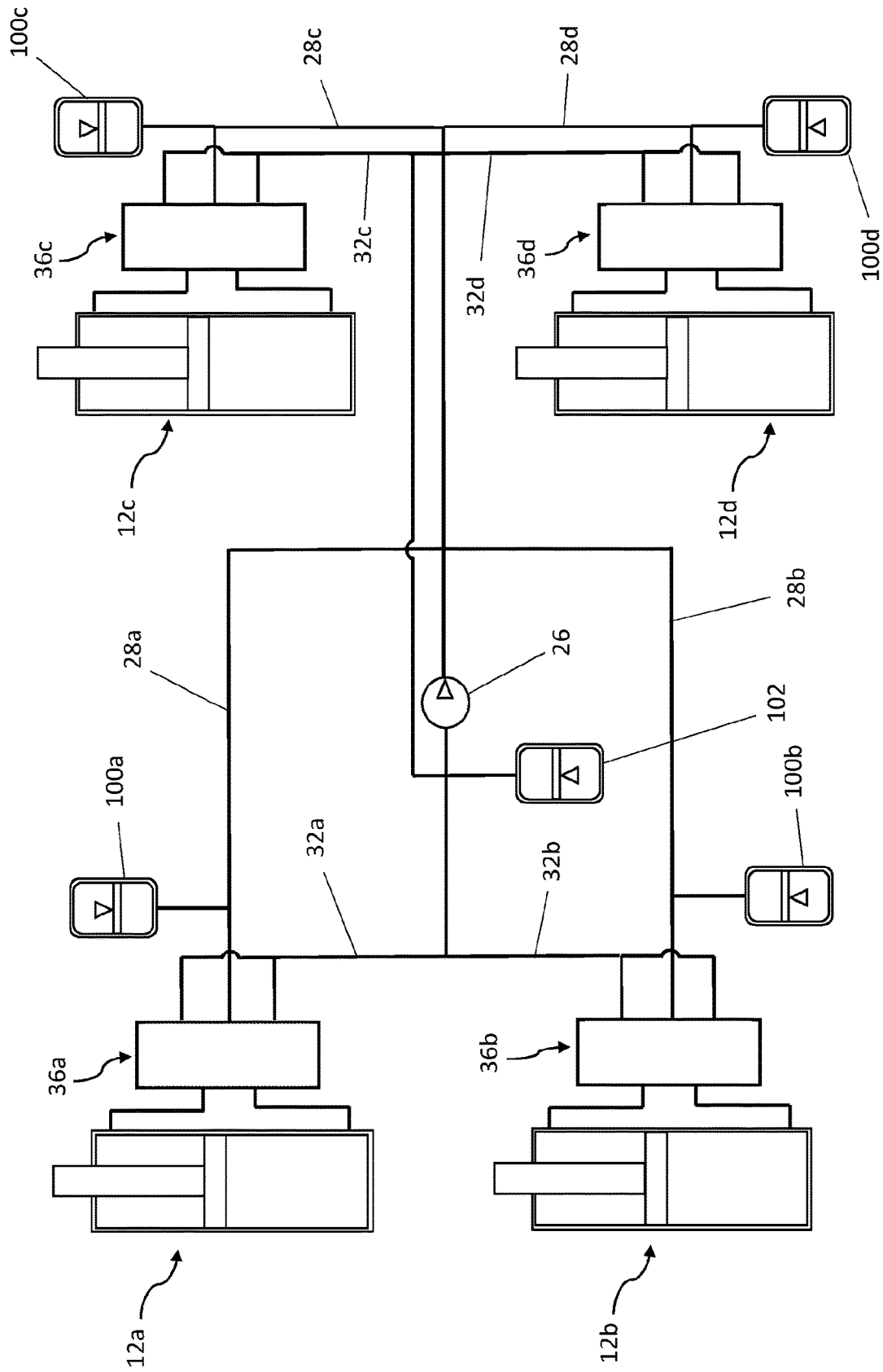
FIG. 16 schematically shows an active vehicle suspension architecture according to an embodiment of the present invention.

Applied to a four-wheel vehicle, as shown in the diagram of FIG. 16, the active suspension according to the present invention will include, for each wheel, a respective actuator 12a, 12b, 12c, 12d and a respective flow control valve 36a, 36b, 36c, 36d, configured as a rotary spool valve, to control the force exerted by that actuator between the vehicle wheel associated therewith and the vehicle body. Each actuator 12a, 12b, 12c, 12d is connected with a respective high-pressure line 28a, 28b, 28c, 28d and a respective low-pressure line 32a, 32b, 32c, 32d via the respective flow control valve 36a, 36b, 36c, 36d. A respective first pressure accumulator 100a, 100b, 100c, 100d is connected to each high-pressure line 28a, 28b, 28c, 28d. In contrast, as far as the low-pressure lines 32a, 32b, 32c, 32d are concerned, in the present example they are all connected to the same second pressure accumulator 102. In addition, in the present example, a single pump 26 is provided that is capable of supplying pressurized fluid to all the high-pressure lines 28a, 28b, 28c, 28d, thus to all the actuators 12a, 12b, 12c, 12d. Alternatively, there might be two pumps, each arranged to supply pressurized fluid to the two actuators associated with the wheels of one respective axle (front or rear) of the vehicle, or four pumps, each arranged to supply pressurized fluid to the actuator associated with one respective wheel of the vehicle.

The present invention has been described herein with reference to preferred embodiments thereof. It is to be understood that other embodiments may be envisaged, which share the same inventive core with those described herein, as defined by the appended claims.

The invention claimed is:

1. An active suspension for a vehicle, comprising:
a hydraulic actuator designed to be arranged between a respective wheel of the vehicle and a body of the vehicle and comprising a cylinder and a piston slidably mounted inside the cylinder so as to divide an internal volume of the cylinder into a pair of variable-volume chambers, namely a compression chamber and an extension chamber, both containing a working fluid, and
a supply hydraulic circuit connected to the hydraulic actuator to supply the compression chamber and the extension chamber with the working fluid,
wherein the supply hydraulic circuit comprises a hydraulic pump, a high-pressure line connected to a delivery port of the hydraulic pump, a low-pressure line connected to a suction port of the hydraulic pump, and a flow control valve connected on one side to the compression chamber and the extension chamber of the hydraulic actuator and on the other side to the high-pressure line and the low-pressure line to put said compression and extension chambers of the hydraulic actuator in fluid communication with said high-pressure and low-pressure lines of the supply hydraulic circuit,
wherein the flow control valve is a spool valve comprising a spool which is continuously movable between a plurality of operating positions comprised, in a first direction, between a zero position and a first end operating position and, in a second direction opposite to the first direction, between said zero position and a second end operating position, and
wherein the flow control valve is configured such that in each operating position of the spool between said first end operating position and said second end operating position it connects at least one of the compression chamber and the extension chamber of the hydraulic actuator with the high-pressure line,
wherein the spool of the flow control valve is a rotary spool, configured to move between said first and second end operating positions by rotation about an axis of rotation, and in that the flow control valve further comprises an actuating unit for driving the spool into rotation in one direction or the other about said axis of rotation, said actuating unit being formed by an electric motor which is mounted coaxially with the spool and comprises a rotor, a stator and a shaft on which the rotor is mounted so as to be drivingly connected for rotation therewith, said shaft being rigidly connected with the spool.

2. A suspension according to claim 1, wherein the shaft of the electric motor is formed in one piece with the spool.

3. The suspension according to claim 1, wherein the flow control valve further comprises an outer body, acting as an outer casing for said valve, including said actuating unit, and an inner sleeve, inserted into a cylindrical inner cavity of the outer body and having a cylindrical inner cavity, the axis of which defines said axis of rotation and into which the spool is inserted.

4. The suspension according to claim 3, wherein the outer body of the flow control valve has a first inlet port connected with the high-pressure line, a second inlet port connected with the low-pressure line, a first outlet port connected with the compression chamber of the actuator, and a second outlet port connected with the extension chamber of the actuator,
wherein the inner sleeve of the flow control valve has a plurality of cylindrical regions, in which there are provided fluid passage ports extending through the entire thickness of the inner sleeve, and a plurality of annular sectors, which have a diameter larger than that of said cylindrical regions and separate said cylindrical regions from each other in a fluid-tight manner,
wherein said plurality of cylindrical regions includes:
a pair of axially outermost cylindrical regions, which face said second inlet port and said second outlet port, respectively, and have a plurality of first low-pressure ports and a plurality of second low-pressure ports,
a central cylindrical region, which faces said first inlet port and has a plurality of first high-pressure ports and second high-pressure ports arranged on two circumferences placed side by side, and
a pair of axially intermediate cylindrical regions, each arranged between a respective axially outermost cylindrical region and said central cylindrical region, wherein one of said axially intermediate cylindrical regions faces first outlet port and has a plurality of first ports and the other faces said second outlet port and has a plurality of second ports,
wherein the spool has, on an outer cylindrical surface thereof, first longitudinal channels, which extend parallel to said axis of rotation and have a length and arrangement such that they are selectively overlappable by said first low-pressure ports, said first ports and said first high-pressure ports, as well as second longitudinal channels, which extend parallel to said axis of rotation, being in particular aligned each with a respective first longitudinal channel, and have a length and arrangement such that they are selectively overlappable by said second low-pressure ports, said second ports and said second high-pressure ports, wherein said first longitudinal channels and said second longitudinal channels are arranged angularly equally spaced in the circumferential direction, and wherein said first longitudinal channels are in fluid communication with each other via first radial channels and said second longitudinal channels are in fluid communication with each other via second radial channels.

5. The suspension according to claim 4, wherein said first low-pressure ports and said second low-pressure ports are arranged angularly equally spaced in the circumferential direction, each of said plurality of first low-pressure ports and said plurality of second low-pressure ports preferably comprising four ports arranged at 90 degrees to each other, said first low-pressure ports being in particular offset by 45 degrees with respect to said second low-pressure ports.

6. The suspension according to claim 4, wherein said first high-pressure ports are arranged angularly equally spaced on a first circumference, in particular at 90 degrees to each other, and wherein said second high-pressure ports are arranged angularly equally spaced on a second circumference, in particular at 90 degrees to each other, and are offset by a certain angle, in particular by an angle less than 45 degrees, with respect to said first high-pressure ports.

7. The suspension according to claim 4, wherein said first ports and said second ports are made in the form of slots elongated in the circumferential direction and are arranged angularly equally spaced in the circumferential direction.

8. The suspension according to claim 4, wherein the spool of the flow control valve further has first safety grooves, which extend along the circumference of the spool and connect said first longitudinal channels to each other, and second safety grooves, which extend along the circumference of the spool and connect said second longitudinal channels to each other, wherein said first and second safety grooves have a reduced flow cross-sectional area both in comparison with said first and second longitudinal channels of the spool and in comparison with said first and second ports of the inner sleeve.

9. The suspension according to claim 4, further comprising a first check valve, which is arranged in a flow path between said second inlet port and said first outlet port and is configured to allow the working fluid to flow in the direction from said second inlet port to said first outlet port only, and a second check valve, which is arranged in a flow path between said second inlet port and said second outlet port and is configured to allow the working fluid to flow in the direction from said second outlet port to said second inlet port only.

10. The suspension according to claim 1, wherein the flow control valve is configured such that in said zero position of the spool the compression chamber and the extension chamber of the hydraulic actuator are both connected with the high-pressure line only, as well as, via the flow control valve, with each other, in said first end operating position of the spool, the compression chamber is connected with the high-pressure line only, while the extension chamber is connected with the low-pressure line only, in each intermediate operating position of the spool between said zero position and said first end operating position, the compression chamber is connected with the high-pressure line only, while the extension chamber is connected with the high-pressure line and/or the low-pressure line, in said second end operating position of the spool the extension chamber is connected with the high-pressure line only, while the compression chamber is connected with the low-pressure line only, and in each intermediate operating position of the spool between said zero position and said second end operating position, the extension chamber is connected with the high-pressure line only, while the compression chamber is connected with the high-pressure line and/or the low-pressure line.

11. The suspension according to claim 1, wherein the flow control valve is also configured such that the spool is movable to a safety position in which both the compression chamber and the extension chamber of the hydraulic actuator are connected with the low-pressure line only.

12. The suspension according to claim 8, wherein the flow control valve is configured such that the spool is movable to a safety position in which both the compression chamber and the extension chamber of the hydraulic actuator are connected with the low-pressure line only, and wherein the flow control valve is configured such that in said safety position the compression chamber and the extension chamber of the hydraulic actuator are connected with the low-pressure line via said first safety grooves and said second safety grooves, respectively.

13. The suspension according to claim 11, wherein the flow control valve further comprises elastic means, arranged to exert on the spool an elastic reaction torque tending to bring the spool to said safety position.

14. A vehicle comprising a body, a plurality of wheels and, for each wheel, a respective suspension according to claim 1.

15. The vehicle according to claim 14, wherein the supply hydraulic circuit comprises a single hydraulic pump adapted to supply all the hydraulic actuators via respective high-pressure lines, or a first hydraulic pump adapted to supply all the hydraulic actuators associated with the wheels of a first axle of the vehicle via respective high-pressure lines, and a second hydraulic pump adapted to supply all the hydraulic actuators associated with the wheels of a second axle of the vehicle via respective high-pressure lines, or again, for each hydraulic actuator, a respective hydraulic pump adapted to supply the hydraulic actuator via a respective high-pressure line.

16. The suspension according to claim 7, wherein there are four first ports and four second ports arranged at 90 degrees to each other.

17. The suspension according to claim 13, wherein the elastic means is a torsion bar.

\* \* \* \* \*